United States Patent
Takahashi et al.

(10) Patent No.: US 10,712,682 B2
(45) Date of Patent: Jul. 14, 2020

(54) TONER AND IMAGE FORMING METHOD

(71) Applicant: Konica Minolta, Inc., Tokyo (JP)

(72) Inventors: Seijiro Takahashi, Kokubunji (JP); Haruo Horiguchi, Koganei (JP); Toyoko Shibata, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/506,010

(22) Filed: Jul. 9, 2019

(65) Prior Publication Data
US 2020/0073269 A1 Mar. 5, 2020

(30) Foreign Application Priority Data
Aug. 28, 2018 (JP) ................. 2018-159151

(51) Int. Cl.
*G03G 9/097* (2006.01)
*G03G 9/087* (2006.01)
*G03G 9/09* (2006.01)
*G03G 15/04* (2006.01)
*C08F 120/36* (2006.01)

(52) U.S. Cl.
CPC ....... *G03G 9/09775* (2013.01); *C08F 120/36* (2013.01); *G03G 9/08711* (2013.01); *G03G 15/04036* (2013.01)

(58) Field of Classification Search
CPC .......... G03G 9/09775; G03G 9/08711; G03G 15/04036; C08F 120/36
See application file for complete search history.

(56) References Cited

FOREIGN PATENT DOCUMENTS

JP 2014191077 A 10/2014
JP 2014191078 A 10/2014

*Primary Examiner* — Thorl Chea
(74) *Attorney, Agent, or Firm* — Lucas & Mercanti, LLP

(57) ABSTRACT

A toner includes toner particles, wherein the toner particles contain a polymer containing a structural unit derived from an azobenzene derivative having a polymerizable group.

17 Claims, 2 Drawing Sheets

TONER AND IMAGE FORMING METHOD

The entire disclosure of Japanese patent Application No. 2018-159151, filed on Aug. 28, 2018, is incorporated herein by reference in its entirety.

BACKGROUND

Technological Field

The present invention relates to a toner and an image forming method.

Description of the Related Art

As an electrophotographic image forming method, conventionally, a method for developing an electrostatic latent image formed on a photoreceptor with a toner, then transferring the obtained toner image onto a sheet, and thermally fixing the toner image to form an image on the sheet is known. As described above, in order to fix a toner image on a sheet by thermal fixing, it is necessary to heat a toner to a high temperature and to melt the toner once. Therefore, there is a limit to save energy.

In recent years, with energy saving and improvement in operability at the time of image formation and diversification of types of recording media, a method for fixing a toner image on a recording medium by an external stimulus different from heat has been studied. Above all, a light fixing method relatively compatible with an electrophotographic process is attracting attention, and a developer (light melting toner) softened by light irradiation has been reported.

For example, JP 2014-191078 A discloses a developer containing a binder resin, a colorant, and a compound that undergoes a cis-trans isomerization reaction and phase transition by light absorption as an additive. JP 2014-191078 A discloses a method for irradiating a toner image transferred onto a sheet with light to melt a compound that undergoes phase transition due to light absorption, and then irradiating the toner image with light again to solidify the compound to fix the toner image on the sheet. In addition, JP 2014-191077 A discloses an image forming apparatus using a developer containing a compound that undergoes a cis-trans isomerization reaction and phase transition by light absorption.

However, toner images obtained using the developers disclosed in JP 2014-191078 A and JP 2014-191077 A have low image intensities disadvantageously.

SUMMARY

The present invention has been achieved in view of the above circumstances, and an object of the present invention is to provide a toner and an image forming method capable of forming a toner image having a high image intensity in a fixing method by light irradiation.

To achieve the abovementioned object, according to an aspect of the present invention, a toner reflecting one aspect of the present invention comprises toner particles, wherein the toner particles contain a polymer containing a structural unit derived from an azobenzene derivative having a polymerizable group.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
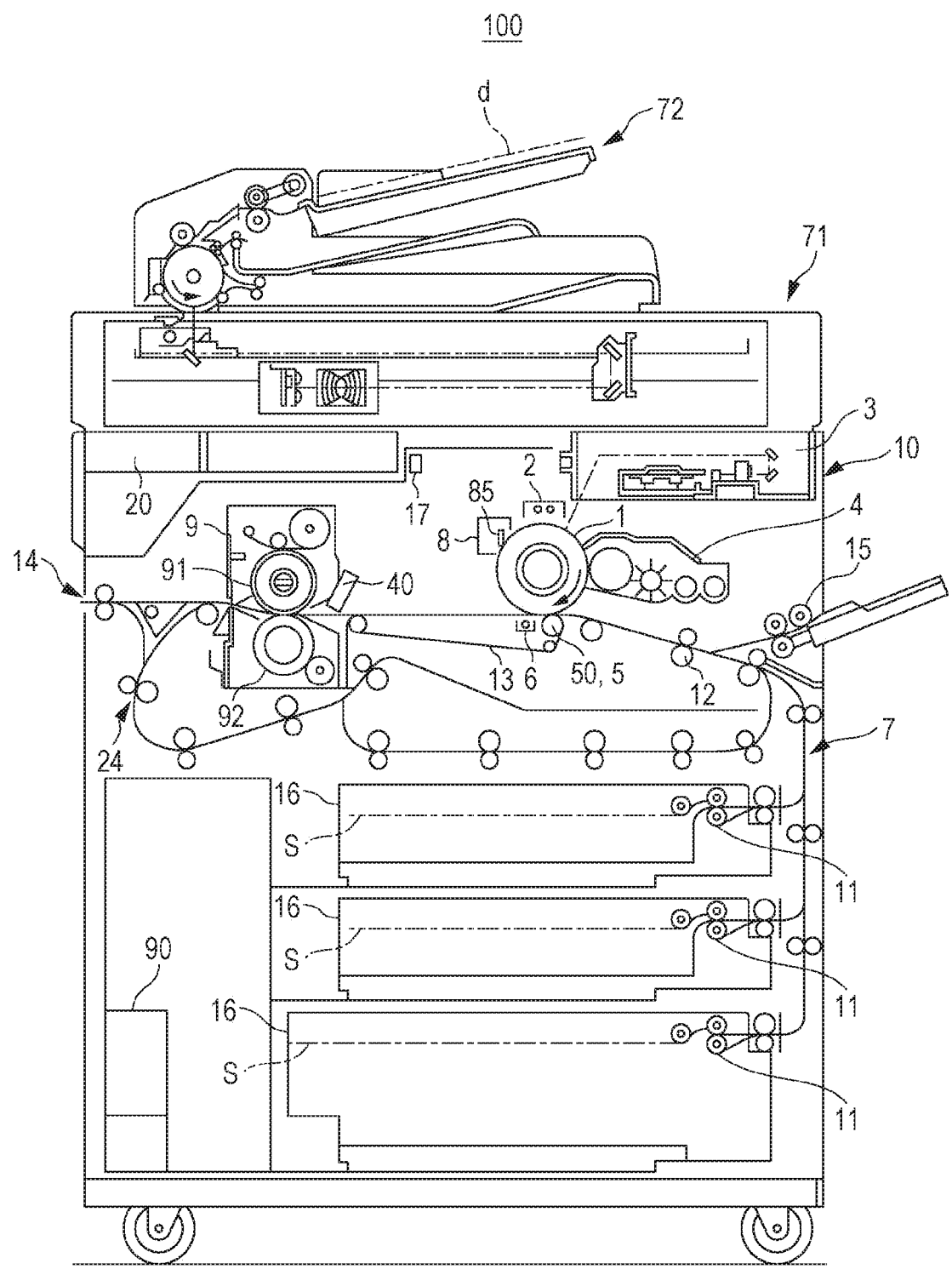
FIG. 1 is a schematic configuration view illustrating an image forming apparatus.

Hereinafter, one or more embodiments of the present invention will be described with reference to the drawings. However, the scope of the invention is not limited to the disclosed embodiments.

The present inventors made intensive studies, and as a result, have found that by adding a polymer (A) containing a structural unit having an azobenzene group, specifically, a "polymer (A1) obtained by polymerizing an azobenzene derivative having a polymerizable group" or the "polymer (A) containing a structural unit having an azobenzene group and having a number average molecular weight Mn of 3500 or more" to toner particles, an image intensity of an obtained toner image can be enhanced while the toner image is melted or softened by light irradiation to be fixed on a recording medium.

A reason for this is not clear, but is presumed as follows. First, by absorption of light by an azobenzene group and transmission (photothermal conversion) of thermal energy released in a photoexcitation/deactivation process to connected repeating units (structural units), the polymer (A) containing a structural unit having an azobenzene group is softened to melt or soften the toner image. Particularly, when the polymer (A) has a trans form (see the left side of the following scheme), in addition to the above-described photothermal conversion, trans-cis photoisomerization is more likely to occur, and a cis form having a low Tg (see the right side of the following scheme) is easily generated. Therefore, the toner image is easily melted or softened even with an irradiation light quantity of lower energy.

[Chemical formula 5]

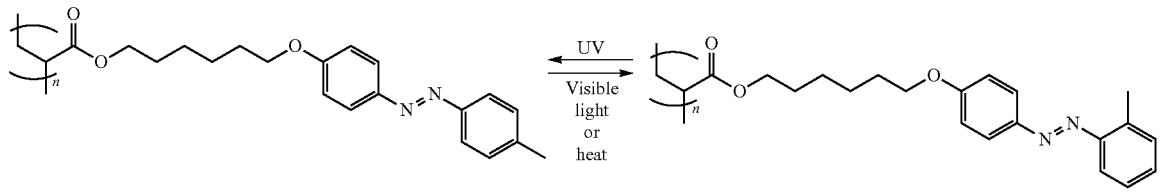

By increasing the number average molecular weight Mn of the polymer (A) to a certain value or more or using a polymer (A2) obtained by polymerizing an azobenzene derivative (monomer) having a polymerizable group as the polymer (A), for example, it is possible to make it easier to exhibit azobenzene group packing (ππ interaction) within a molecule or between molecules than a conventional compound obtained by a reaction of a sugar alcohol with an azobenzene group-containing compound. As a result, photothermal conversion and photoisomerization are more efficiently performed. Therefore, it is considered that a toner image can be more easily melted or softened by light irradiation, and an image intensity of an obtained toner image can be enhanced. Furthermore, in a case where the number average molecular weight Mn of the polymer (A) is increased to a certain value or more, the polymer (A) itself has high toughness (strength). Therefore, it is considered that an image intensity of an obtained toner image can be enhanced also from this viewpoint. The present invention has been achieved based on these findings.

1. Toner

A toner according to an embodiment of the present invention contains an aggregate of toner particles containing at least the polymer (A) containing a structural unit having an azobenzene group.

<Polymer (A) Containing Structural Unit having Azobenzene Group>

The polymer (A) containing a structural unit having an azobenzene group may be the polymer (A1) obtained by polymerizing an azobenzene derivative (a1-1) (azobenzene derivative monomer) having a polymerizable group, or the polymer (A2) obtained by a reaction between a polymer (a2-1) containing a structural unit having a hydroxy group and an azobenzene compound (a2-2) having a functional group that reacts with the hydroxy group.

Regarding Polymer (A1):

The polymer (A1) contains a structural unit derived from the azobenzene derivative (a1-1) having a polymerizable group. The polymer (A1) is obtained by polymerizing a monomer composition containing the azobenzene derivative (a1-1) having a polymerizable group.

The number of polymerizable groups contained in one molecule of the azobenzene derivative (a1-1) having a polymerizable group may be one or two or more. Above all, the number of polymerizable groups contained in one molecule of the azobenzene derivative (a1-1) having a polymerizable group is preferably 1, that is, the azobenzene derivative (a1-1) is preferably a monofunctional polymerizable monomer from a viewpoint of easily obtaining a polymer that is easily melted even with a low light irradiation energy amount.

Examples of the polymerizable group include a (meth)acryloyl group, an epoxy group, and a vinyl group. Above all, the (meth)acryloyl group is preferable. Note that the "(meth)acryloyl group" means an acryloyl group or a methacryloyl group.

That is, the azobenzene derivative (a1-1) having a polymerizable group preferably has a group represented by any one of the following formulas (i) to (iii) as the polymerizable group.

[Chemical formula 6]

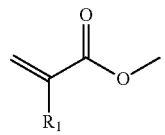
(i)

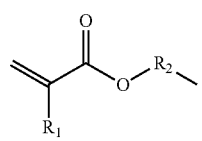
(ii)

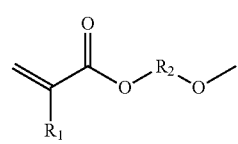
(iii)

In formulas (i) to (iii), $R_1$ represents a hydrogen atom or a methyl group. $R_2$ represents an alkylene group having 1 to 12 carbon atoms. The alkylene group having 1 to 12 carbon atoms is preferably an alkylene group having 3 to 10 carbon atoms. The alkylene group may be linear or branched, and is preferably linear. A part of the alkylene group may be replaced with a substituent. Examples of the substituent include a halogen group, a nitro group, a hydroxy group, and a carboxy group.

The azobenzene derivative (a1-1) having a polymerizable group is preferably represented by the following formula (1).

[Chemical formula 7]

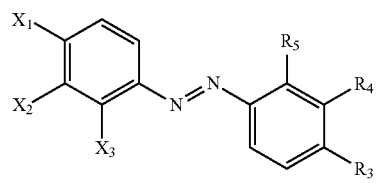
(1)

In formula (1), any one of $X_1$ to $X_3$ represents a polymerizable group, and the remaining groups each represent a hydrogen atom. The polymerizable group is preferably represented by any of the above-described formulas (i) to (iii), and more preferably represented by formula (iii).

$R_3$ to $R_5$ each represent a hydrogen atom, a functional group containing a hetero atom, an alkyl group having 1 to 12 carbon atoms, or an alkoxy group having 1 to 12 carbon atoms. Examples of the functional group containing a hetero atom include a nitro group, a hydroxy group, and a carboxy group. The alkyl group having 1 to 12 carbon atoms and the alkoxy group having 1 to 12 carbon atoms are preferably an alkyl group having 1 to 4 carbon atoms and an alkoxy group having 1 to 4 carbon atoms, respectively. A part of each of the alkyl group and the alkoxy group may be replaced with such a substituent as described above.

Above all, when $R_3$ to $R_5$ each represent a group having a too long carbon chain or a group that easily causes interaction, in the polymer (A), $R_3$ to $R_5$ of different molecules are easily entangled with each other or easily cause interaction to make photoisomerization less likely to occur in some cases. $R_3$ to $R_5$ preferably each represent a group having a relatively short carbon chain or a group that hardly causes interaction, and more preferably each represent a hydrogen atom, an alkyl group having 1 to 4 carbon atoms, or an alkoxy group having 1 to 4 carbon atoms from a viewpoint of avoiding such disadvantages.

Above all, the azobenzene derivative (a1-1) having a polymerizable group is represented more preferably by the following formula (2), particularly preferably by the following formula (3) from a viewpoint of facilitating photoisomerization to easily melt or soften a toner image even with lower energy light irradiation.

[Chemical formula 8]

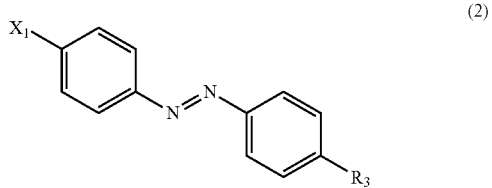

(2)

In formula (2), $X_1$ and $R_3$ are synonymous with $X_1$ and $R_3$ in formula (1), respectively.

[Chemical formula 9]

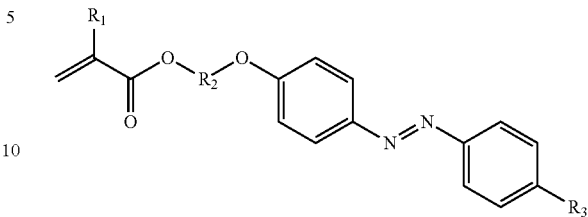

(3)

In formula (3), $R_1$ and $R_3$ are synonymous with $X_1$ and $R_3$ in formula (1), respectively, and $R_2$ is synonymous with $R_2$ in formulas (i) to (iii). Above all, in formula (3), $R_3$ preferably represents a hydrogen atom, an alkyl group having 1 to 4 carbon atoms, or an alkoxy group having 1 to 4 carbon atoms.

The polymer (A1) may further contain a structural unit derived from another monomer (a1-2) in addition to a structural unit derived from the azobenzene derivative (a1-1) having a polymerizable group. Examples of the other monomer (a1-2) include a styrene derivative.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene.

The content of a structural unit derived from the other monomer (a1-2) is preferably 70% by mass or less, and more preferably 40% by mass or less with respect to 100% by mass of the total amount of all the structural units constituting the polymer (A1).

Specific examples of the polymer (A1) thus obtained include the following.

[Chemical formula 10]

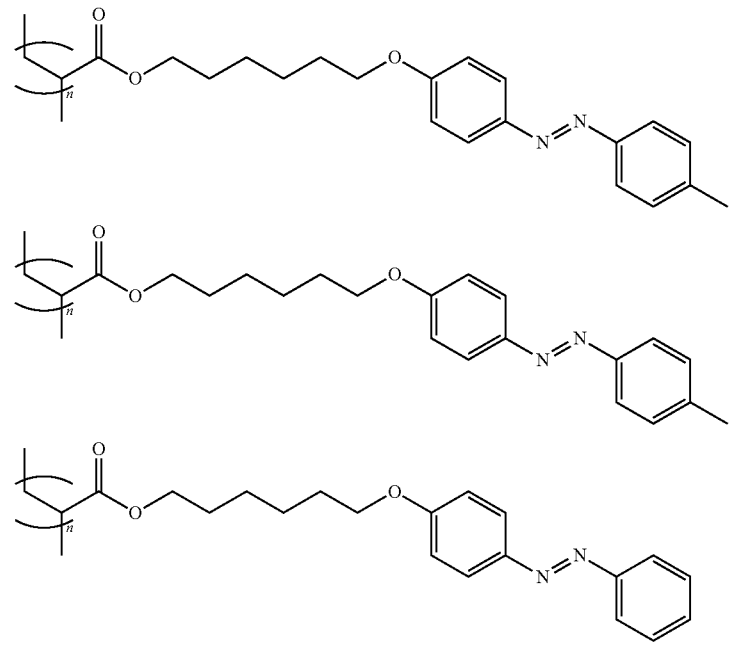

-continued

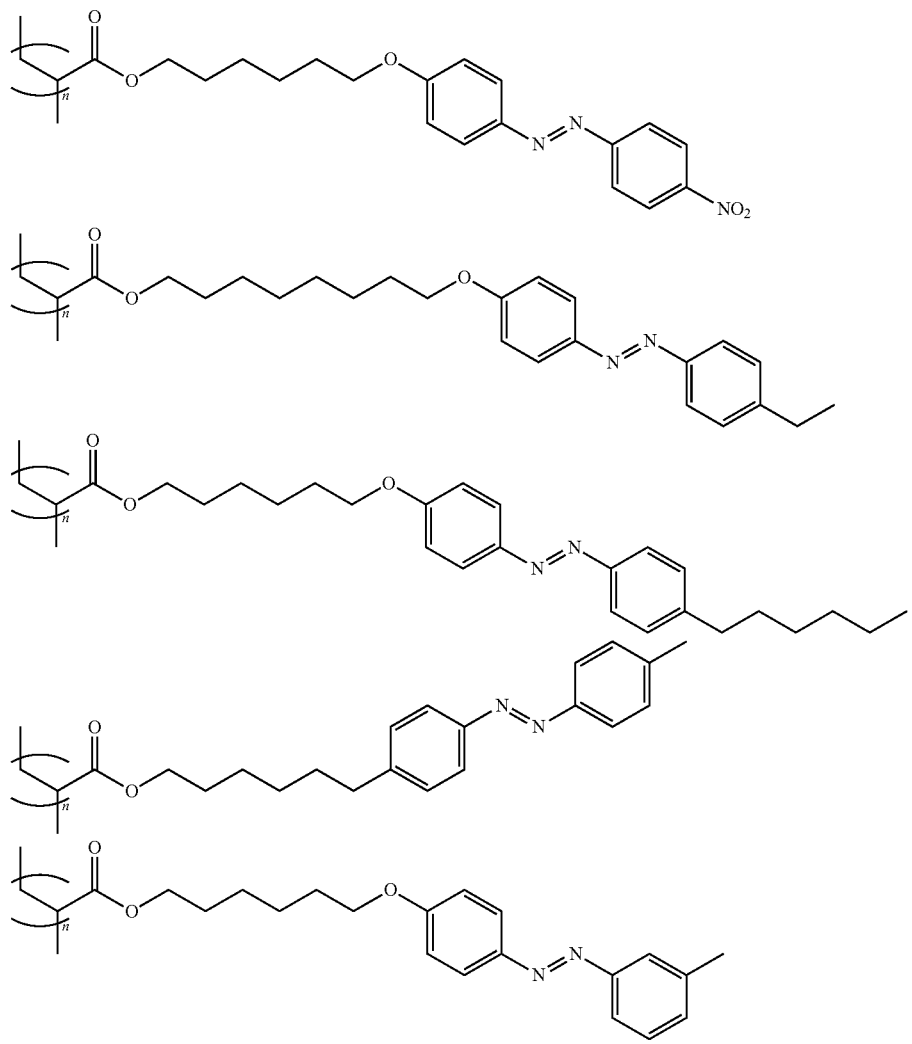

[Chemical formula 11]

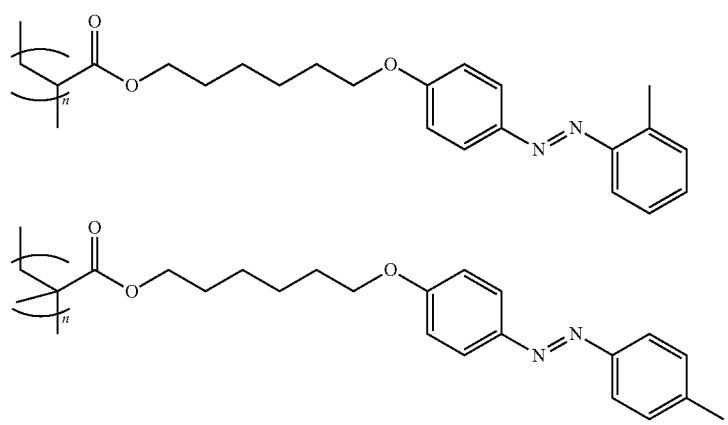

Regarding Polymer (A2):

The polymer (A2) is obtained, as described above, by a reaction between the polymer (a2-1) containing a structural unit having a hydroxy group and the azobenzene compound (a2-2) having a functional group that reacts with the hydroxy group.

Examples of the polymer (a2-1) containing a structural unit having a hydroxy group include an epoxy resin (polymer containing a structural unit derived from a ring-opened product of glycidyl ether), a polyvinyl alcohol resin, and a butyral resin (partial butyralide of polyvinyl alcohol resin). Above all, the polyvinyl alcohol resin is preferable.

The azobenzene compound (a2-2) having a functional group that reacts with a hydroxy group may be an azobenzene compound having a halogenated acyl group (as a functional group that reacts with a hydroxy group). The azobenzene compound having a halogenated acyl group may be, for example, a compound represented by the following formula (4).

[Chemical formula 12]

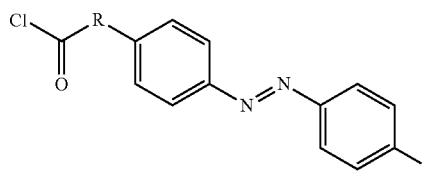

(4)

In formula (4), R may be a single bond, an alkylene group, or an alkoxylene group (—RO—). R' may be a hydrogen atom, a hydroxy group, a functional group containing a hetero atom, an alkyl group having 1 to 12 carbon atoms, or an alkoxy group having 1 to 12 carbon atoms.

The azobenzene compound represented by formula (4) can be obtained, for example, by causing a reaction between a hydroxyazobenzene compound and a halogen atom-containing carboxylic acid compound under alkaline conditions to obtain a carboxyl group-containing azobenzene derivative, and then causing the carboxyl group-containing azobenzene derivative to react with an acid halogenating agent.

The halogen atom-containing carboxylic acid compound is a compound having a carboxyl group and a halogen atom, preferably a halogen atom-containing carboxylic acid compound having 2 to 17 carbon atoms, and more preferably a halogen atom-containing carboxylic acid compound having 9 to 13 carbon atoms. Examples of the halogen atom of the halogen atom-containing carboxylic acid compound include a fluorine atom, a chlorine atom, a bromine atom, and an iodine atom, and the bromine atom is preferable.

Examples of the acid halogenating agent include thionyl chloride, oxalyl chloride, phosgene, phosphorus oxychloride, phosphorus pentachloride, phosphorus trichloride, thionyl bromide, phosphorus tribromide, and diethylaminosulfur trifluoride. Above all, thionyl chloride is preferable.

Specific examples of the polymer (A2) thus obtained include the following.

[Chemical formula 13]

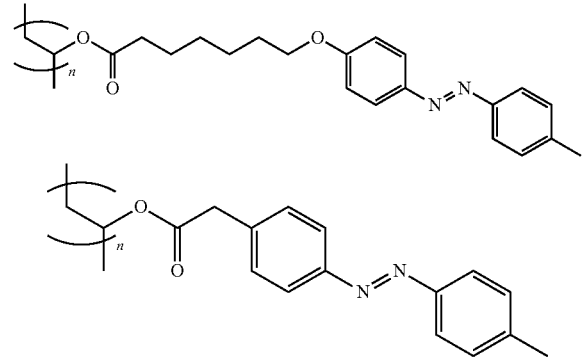

As described above, the polymer (A2) is obtained by a reaction between the polymer (a2-1) containing a structural unit having a hydroxy group and the azobenzene compound (a2-2) having a functional group that reacts with the hydroxy group. Therefore, some hydroxy groups are likely to remain while being unreacted, and not all the hydroxy groups are replaced with azobenzene group-containing groups in some cases. Therefore, the polymer (A) containing a structural unit having an azobenzene group is preferably the polymer (A1) obtained by polymerizing the azobenzene derivative (a1-1) having a polymerizable group from a viewpoint of reliably making it easy to introduce an azobenzene group into a molecule and making it easy to obtain a toner image having high fixability and a high image intensity.

Apart from that, the molecular weight of each of the polymers (A1) and (A2) is preferably high from a viewpoint of easily obtaining a toner image having a high image intensity.

That is, the toner according to an embodiment of the present invention is preferably a first toner containing toner particles containing the "polymer (A1) obtained by polymerizing an azobenzene derivative having a polymerizable group" as the polymer (A) containing a structural unit having an azobenzene group, or a second toner containing toner particles containing the "polymer (A) having a number average molecular weight Mn of 3500 or more" as the polymer (A) containing a structural unit having an azobenzene group.

The number average molecular weight Mn of the polymer (A1) in the first toner according to an embodiment of the present invention is not particularly limited, but is preferably 2000 to 100000, more preferably 3000 to 75000, and still more preferably 4000 to 50000.

The number average molecular weight Mn of the polymer (A) in the second toner according to an embodiment of the present invention is 3500 or more, preferably 3500 to 100000, more preferably 4000 to 75000, and still more preferably 5000 to 50000. An upper limit value of the number average molecular weight Mn of the polymer (A) in the second toner is not particularly limited, but may be similar to the value described above. The polymer (A) in the second toner may be the above-described polymer (A1) or polymer (A2).

The number average molecular weight Mn of the polymer (A1) in the first toner according to an embodiment of the present invention or the polymer (A) in the second toner according to an embodiment of the present invention can be measured by gel permeation chromatography (GPC).

Specifically, tetrahydrofuran (THF) is caused to flow as a carrier solvent at a flow rate of 0.2 mL/min while a column temperature is maintained at 40° C. using a device "HLC-8120GPC" (manufactured by Tosoh Corporation) and a column "TSK guard column+TSK gel Super HZ-M triplicate" (manufactured by Tosoh Corporation). A measurement sample is obtained by dissolving the polymer (A1) or (A) in tetrahydrofuran so as to have a concentration of 1 mg/ml. The solution is prepared by performing a treatment at room temperature for five minutes using an ultrasonic disperser. Next, the solution is treated with a membrane filter with a pore size of 0.2 μm to obtain a sample solution. Thereafter, 10 μL of the sample solution is injected into the device together with the carrier solvent and detected using a refractive index detector (RI detector). Based on a calibration curve created using monodispersed polystyrene standard particles, a molecular weight distribution of the measurement sample is calculated, and the number average molecular weight Mn thereof is specified. Ten points are used as polystyrene for calibration curve measurement.

Above all, the toner according to an embodiment of the present invention is more preferably the first toner according to an embodiment of the present invention, and the number average molecular weight Mn of the polymer (A1) contained in the first toner is still more preferably 3500 or more.

The toner particles preferably further contain a binder resin from a viewpoint of facilitating enhancement of an image intensity of a toner image.

<Binder Resin>

The binder resin is a resin having no azobenzene group, and may be a resin generally used as a binder resin constituting a toner. Examples of the binder resin include a styrene resin, an acrylic resin, a styrene acrylic resin, a polyester resin, a silicone resin, an olefin resin, an amide resin, and an epoxy resin. The binder resins may be used singly or in combination of two or more types thereof.

Above all, the binder resin preferably contains at least one selected from the group consisting of a styrene resin, an acrylic resin, a styrene acrylic resin, and a polyester resin, and more preferably contains at least one selected from the group consisting of a styrene acrylic resin and a polyester resin from a viewpoint of reducing viscosity when being melted and having high sharpness meltability.

(Styrene Acrylic Resin)

The styrene acrylic resin is a polymer containing at least a structural unit derived from a styrene monomer and a structural unit derived from a (meth)acrylate monomer.

Examples of the styrene monomer include those similar to the above-described styrene monomers that can constitute the polymer (A1).

The (meth)acrylate in the (meth)acrylate monomer means acrylic acid and methacrylic acid. Examples of the (meth) acrylate monomer include methyl (meth)acrylate, ethyl (meth)acrylate, n-propyl (meth)acrylate, isopropyl (meth) acrylate, n-butyl (meth)acrylate, isobutyl (meth) acrylate, tert-butyl (meth)acrylate, n-octyl (meth)acrylate, 2-ethylhexyl (meth)acrylate, stearyl (meth)acrylate, dodecyl (meth) acrylate, phenyl (meth)acrylate, diethylaminoethyl (meth) acrylate, and dimethylaminoethyl (meth)acrylate.

The styrene monomers may be used singly or in combination of two or more types thereof, and the (meth)acrylate monomers may be used singly or in combination of two or more types thereof.

The contents of a structural unit derived from the styrene monomer and a structural unit derived from the (meth) acrylate monomer in the styrene acrylic resin are not particularly limited, and can be adjusted appropriately from a viewpoint of controlling the softening point and the glass transition temperature of the binder resin. Specifically, the content of a structural unit derived from the styrene monomer is preferably 40 to 95% by mass, and more preferably 50 to 80% by mass with respect to the total amount of monomers. The content of a structural unit derived from the (meth)acrylate monomer is preferably 5 to 60% by mass, and more preferably 10 to 50% by mass with respect to the total amount of monomers.

The styrene acrylic resin may further contain a structural unit derived from a monomer other than the styrene monomer and the (meth)acrylate monomer as necessary. Examples of the other monomer include a vinyl monomer.

Examples of the vinyl monomer include those described below.

(1) Olefin

Ethylene, propylene, isobutylene, and the like (2) Vinyl ester

Vinyl propionate, vinyl acetate, vinyl benzoate, and the like (3) Vinyl ether

Vinyl methyl ether, vinyl ethyl ether, and the like (4) Vinyl ketone

Vinyl methyl ketone, vinyl ethyl ketone, vinyl hexyl ketone, and the like (5) N-vinyl compound N-vinylcarbazole, N-vinyl indole, N-vinyl pyrrolidone, and the like.

(6) Others

A vinyl compound such as vinyl naphthalene or vinyl pyridine; and an acrylic acid derivative or a methacrylic acid derivative such as acrylonitrile, methacrylonitrile, or acrylamide.

(Polyester Resin)

The polyester resin is a polyester resin obtained by a polycondensation reaction between a di- or higher valent carboxylic acid (polyvalent carboxylic acid component) and a di- or higher hydric alcohol (polyhydric alcohol component). Note that the polyester resin may be amorphous or crystalline.

The valence of each of the polyvalent carboxylic acid component and the polyhydric alcohol component is preferably 2 or 3, and more preferably 2. That is, the polyvalent carboxylic acid component preferably contains a dicarboxylic acid component, and the polyhydric alcohol component preferably contains a dialcohol component.

Examples of the dicarboxylic acid component include: a saturated aliphatic dicarboxylic acid such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, or 1,18-octadecanedicarboxylic acid; an unsaturated aliphatic dicarboxylic acid such as methylene succinic acid, fumaric acid, maleic acid, 3-hexendiodic acid, 3-octenedioic acid, or dodecenyl succinic acid; an unsaturated aromatic dicarboxylic acid such as phthalic acid, terephthalic acid, isophthalic acid, tert-butyl isophthalic acid, tetrachlorophthalic acid, chlorophthalic acid, nitrophthalic acid, p-phenylenediacetic acid, 2,6-naphthalene dicarboxylic acid, 4,4'-biphenyldicarboxylic acid, or anthracenedicarboxylic acid; lower alkyl esters thereof; and acid anhydrides thereof. The dicarboxylic acid components may be used singly or in combination of two or more types thereof. The polyvalent carboxylic acid component may further contain a tri- or higher valent polyvalent carboxylic acid such as trimellitic acid or pyromellitic acid, an anhydride thereof, and an alkyl ester thereof having 1 to 3 carbon atoms.

Examples of the diol component include: a saturated aliphatic diol such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosandiol, or neopentyl glycol; an unsaturated aliphatic diol such as 2-butene-1,4-diol, 3-butene-1,4-diol, 2-butyne-1,4-diol, 3-butyne-1,4-diol, or 9-octadecene-7,12-diol; and an aromatic diol or a derivative thereof, such as a bisphenol including bisphenol A and bisphenol F, or an alkylene oxide adduct of a bisphenol including an ethylene oxide adduct thereof and a propylene oxide adduct thereof. The diol components may be used singly or in combination of two or more types thereof.

A content ratio between the polymer (A) containing a structural unit having an azobenzene group and a binder resin is not particularly limited. However, for example, the polymer (A) containing a structural unit having an azobenzene group: binder resin is preferably 5:95 to 100:0 (mass ratio), more preferably 50:50 to 100:0 (mass ratio), and still more preferably 60:40 to 100:0 (mass ratio).

Note that in a case where the toner particles contain a binder resin, for example, the polymer (A) containing a structural unit having an azobenzene group:binder resin is more preferably 50:50 to 95:5 (mass ratio), and still more preferably 60:40 to 90:10 (mass ratio). When the content ratio between the polymer (A) containing a structural unit having an azobenzene group and a binder resin is within the above range, an image intensity and adhesion can be easily further enhanced.

The glass transition temperature (Tg) of the toner particles is preferably 35 to 70° C., and more preferably 40 to 60° C. from viewpoints of fixability, heat resistant storage stability, and the like. The glass transition temperature (Tg) of the toner particles can be adjusted by the content ratio between the polymer and the binder resin, the type of the binder resin, the molecular weight, and the like.

The glass transition temperature of a toner can be measured by a method described in Examples.

Each of the toner particles may have a single-layer structure or a core-shell structure. The type of a binder resin used for a core particle and a shell portion of the core-shell structure is not particularly limited.

The toner particles may further contain other components such as a colorant, a release agent, a charge control agent, and an external additive as necessary.

<Colorant>

A dye and a pigment can be used as the colorant.

Examples of a colorant for obtaining a black toner include carbon black, a magnetic material, and iron-titanium composite oxide black. Examples of the carbon black include channel black, furnace black, acetylene black, thermal black, and lamp black. Examples of the magnetic material include ferrite and magnetite.

Examples of a colorant for obtaining a yellow toner include: dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment yellow 14, C.I. Pigment yellow 17, C.I. Pigment yellow 74, C.I. Pigment yellow 93, C.I. Pigment yellow 94, C.I. Pigment yellow 138, C.I. Pigment yellow 155, C.I. Pigment yellow 180, and C.I. Pigment yellow 185.

Examples of a colorant for obtaining a magenta toner include: dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of a colorant for obtaining a cyan toner include: dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 60, C.I. Pigment Blue 62, C.I. Pigment Blue 66, and C.I. Pigment Blue 76.

Colorants for obtaining toners of colors can be used singly or in combination of two or more types thereof for each of the colors.

The content of a colorant in the toner particles is preferably 0.5 to 20% by mass, and more preferably 2 to 10% by mass.

<Release Agent>

The release agent is not particularly limited, and various known waxes can be used. Examples of the wax include a polyolefin such as low molecular weight polypropylene, polyethylene, or oxidized low molecular weight polypropylene, a paraffin wax, and a synthetic ester wax. Above all, a paraffin wax is preferably used from a viewpoint of improving storage stability of a toner.

The content of the release agent in the toner particles is preferably 1 to 30% by mass, and more preferably 3 to 15% by mass.

<Charge Control Agent>

The charge control agent is not particularly limited as long as being able to provide a positive or negative charge by frictional charging and being colorless, and various known positively chargeable charge control agents and negatively chargeable charge control agents can be used.

The content of the charge control agent in the toner particles is preferably 0.01 to 30% by mass, and more preferably 0.1 to 10% by mass.

<External Additive>

The toner particles may further contain an external additive such as a fluidizing agent as a post-treatment agent or a cleaning aid from a viewpoint of improving flowability, chargeability, cleaning performance, and the like of the toner particles.

Examples of the external additive include inorganic particles such as inorganic oxide particles including silica particles, alumina particles, and titanium oxide particles, inorganic stearic acid compound particles including aluminum stearate particles and zinc stearate particles, or inorganic titanic acid compound particles including strontium titanate particles and zinc titanate particles. These particles may be used singly or in combination of two or more types thereof.

Surfaces of these inorganic particles may be subjected to a hydrophobic treatment with a silane coupling agent, a titanium coupling agent, a higher fatty acid, silicone oil, or the like in order to improve heat resistant storage stability and environmental stability.

The addition amount of the external additive in the toner particles is preferably 0.05 to 5% by mass, and more preferably 0.1 to 3% by mass.

<Physical Properties of Toner Particles>

(Average Particle Diameter)

The average particle diameter of the toner particles is preferably 4 to 20 μm, and more preferably 5 to 15 μm in terms of volume-based median diameter (D50). When the volume-based median diameter (D50) is within the above range, transfer efficiency is increased, image quality of halftone is improved, and image quality of a thin line, a dot, or the like is improved.

The volume-based median diameter (D50) of the toner particles can be measured and calculated using a measuring device in which a computer system (manufactured by Beckman Coulter, Inc.) having data processing software "Software V 3.51" mounted thereon is connected to "Coulter Counter 3" (manufactured by Beckman Coulter, Inc.).

Specifically, 0.02 g of a measurement sample (toner) is added to 20 mL of a surfactant solution (for the purpose of dispersing the toner particles, for example, a surfactant solution obtained by diluting a neutral detergent containing a surfactant component 10 times with pure water) and familiarized. Thereafter, the resulting solution is subjected to ultrasonic dispersion for one minute to prepare a toner dispersion. This toner dispersion is injected into a beaker containing "ISOTON II" (manufactured by Beckman Coulter, Inc.) in a sample stand with a pipette until a display concentration of the measuring device reaches 8%. By setting the display concentration within the above range, a reproducible measured value can be obtained. Then, in the measuring device, the count number of measurement particles is set to 25000, an aperture diameter is set to 50 μm, a measurement range (1 to 30 μm) is divided into 256 parts, and a frequency value is calculated. A particle diameter of 50% from a larger volume integration fraction is taken as the volume-based median diameter (D50).

[Method for Manufacturing Toner Particles]

A method for manufacturing the toner particles is not particularly limited, and may be any method.

For example, in a case of manufacturing toner particles containing at least the polymer (A) containing a structural unit having an azobenzene group and not containing a binder resin, toner particles can be obtained by crushing a composition containing the polymer (A) using a device such as a hammer mill, a feather mill, or a counter jet mill and then performing classification using a dry classifier such as a spin air sieve, a Classiel, or a micron classifier so as to obtain a desired particle diameter. The composition containing the polymer (A) can be obtained by dissolving the polymer (A) and, as necessary, other components such as a colorant in a solvent to obtain a solution, and removing the solvent.

In a case of manufacturing toner particles containing the polymer (A) containing a structural unit having an azobenzene group and a binder resin, the toner particles are preferably obtained by an emulsion aggregation method that makes it easy to control a particle diameter and a shape. Specifically, such a method for manufacturing toner particles preferably includes:

(1A) a binder resin particle dispersion preparation step for obtaining a dispersion of binder resin particles;

(1B) a polymer particle dispersion preparation step for obtaining a dispersion of polymer (A) particles;

(2) an association step of adding a flocculant to an aqueous medium containing binder resin particles, the polymer (A) particles, and as necessary, other components such as colorant particles to promote salting out and simultaneously performing aggregation and fusion to form associated particles;

(3) an aging step of controlling the shapes of the associated particles to form toner particles;

(4) a filtration and washing step of filtering out the toner particles from the aqueous medium to remove a surfactant and the like from the toner particles;

(5) a drying step of drying the washed toner particles; and (6) an external additive addition step of adding an external additive to the dried toner particles.

In a case where the toner particles further contain a colorant, a colorant particle dispersion preparation step (1C) for obtaining a dispersion of colorant particles is preferably performed before association step (2). The steps (1A) to (1C) will be described below.

(1A) Binder resin particle dispersion preparation step

In this step, resin particles are formed by conventionally known emulsion polymerization or the like, and the resin particles are aggregated and fused to form binder resin particles. For example, a polymerizable monomer constituting a binder resin is dispersed in an aqueous medium, and the polymerizable monomer is polymerized by a polymerization initiator to obtain a dispersion of binder resin particles.

In addition, as the method for obtaining a binder resin particle dispersion, for example, a method for performing a dispersion treatment in an aqueous medium without using a solvent, or a method for dissolving a crystalline resin in a solvent such as ethyl acetate to form a solution, emulsifying and dispersing the solution in an aqueous medium using a disperser, and then removing the solvent may be used.

Note that the binder resin may contain a release agent in advance as necessary. For the purpose of dispersion, polymerization may be performed appropriately in the presence of a known surfactant (for example, an anionic surfactant such as polyoxyethylene (2) sodium dodecyl ether sulfate, sodium dodecyl sulfate, or dodecyl benzene sulfonic acid).

The volume-based median diameter of the binder resin particles in the dispersion is preferably 50 to 300 nm. The volume-based median diameter of the binder resin particles in the dispersion can be measured by a dynamic light scattering method using "Microtrack UPA-150" (manufactured by Nikkiso Co., Ltd.).

(1B) Polymer Particle Dispersion Preparation Step

In this step, the polymer (A) is dispersed in a form of fine particles in an aqueous medium to obtain a dispersion of polymer particles.

Specifically, first, an emulsion of the polymer (A) is prepared. The emulsion of the polymer (A) can be obtained, for example, by dissolving the polymer (A) in an organic solvent and then emulsifying the obtained solution in an aqueous medium.

A method for dissolving the polymer (A) in an organic solvent is not particularly limited, and examples thereof include a method for adding the polymer (A) to an organic solvent and stirring and mixing the resulting mixture such that the polymer (A) is dissolved. The addition amount of the polymer (A) is preferably 5 parts by mass or more and 100 parts by mass or less, and more preferably 10 parts by mass or more and 50 parts by mass or less with respect to 100 parts by mass of the organic solvent.

Next, the obtained solution of the polymer (A) and an aqueous medium are mixed and stirred using a known disperser such as a homogenizer. As a result, the polymer (A) becomes droplets and is emulsified in the aqueous medium to obtain an emulsion of the polymer (A). The addition amount of the solution of the polymer (A) is preferably 10 parts by mass or more and 90 parts by mass or less, and more preferably 30 parts by mass or more and 70 parts by mass or less with respect to 100 parts by mass of the aqueous medium.

The temperature of each of the solution of the polymer (A) and the aqueous medium at the time of mixing the solution of the polymer (A) and the aqueous medium is lower than the boiling point of the organic solvent, preferably 20° C. or higher and 80° C. or lower, and more preferably 30° C. or higher and 75° C. or lower.

As stirring conditions of the disperser, for example, in a case where the volume of a stirring container is 1 to 3 L, the number of rotations is preferably 7000 rpm or more and 20000 rpm or less, and stirring time is preferably 10 minutes or more and 30 minutes or less.

The polymer particle dispersion can be obtained by removing the organic solvent from the emulsion of the polymer (A). The organic solvent may be removed from the emulsion of the polymer (A) by, for example, air blowing, heating, pressure reduction, or a combination thereof. For example, the organic solvent can be removed by heating the emulsion of the polymer (A) preferably at 25° C. or higher and 90° C. or lower, more preferably at 30° C. or higher and 80° C. or lower under an inert gas atmosphere such as nitrogen.

The mass average particle diameter of the polymer particles in the polymer particle dispersion is preferably 90 nm or more and 1200 nm or less. The mass average particle diameter of the polymer particles in the polymer particle dispersion can be measured using an electrophoretic light scattering photometer "ELS-800" (manufactured by Otsuka Electronics Co., Ltd.).

<Organic Solvent>

The organic solvent is not particularly limited as long as being able to dissolve the polymer (A). Examples of the organic solvent include: an ester such as ethyl acetate or butyl acetate; an ether such as diethyl ether, diisopropyl ether, or tetrahydrofuran; a ketone such as acetone or methyl ethyl ketone; a saturated hydrocarbon such as hexane or heptane; and a halogenated hydrocarbon such as dichloromethane, dichloroethane, or carbon tetrachloride. These organic solvents may be used singly or in combination of two or more types thereof. Above all, a ketone and a halogenated hydrocarbon are preferable, and methyl ethyl ketone and dichloromethane are more preferable.

<Aqueous Medium>

Examples of the aqueous medium include water and an aqueous medium mainly containing water and optionally containing a water-soluble solvent such as an alcohol or a glycol, a surfactant, a dispersant, or the like. The aqueous medium may be preferably a mixture of water and a surfactant.

The surfactant may be a cationic surfactant, an anionic surfactant, or a nonionic surfactant. Examples of the cationic surfactant include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Examples of the anionic surfactant include a fatty acid soap such as sodium stearate or sodium dodecanoate, sodium dodecylbenzene sulfonate, and sodium dodecyl sulfate. Examples of the nonionic surfactant include polyoxyethylene dodecyl ether, polyoxyethylene hexadecyl ether, polyoxyethylene nonyl phenyl ether, polyoxyethylene dodecyl ether, polyoxyethylene sorbitan monooleate ether, and monodecanoyl sucrose. These surfactants may be used singly or in combination of two or more types thereof. Above all, an anionic surfactant is preferably used, and sodium dodecylbenzene sulfonate is more preferably used.

The addition amount of the surfactant is preferably 0.01 parts by mass or more and 10 parts by mass or less, and more preferably 0.04 parts by mass or more and 1 part by mass or less with respect to 100 parts by mass of the aqueous medium.

(1C) Colorant Particle Dispersion Preparation Step

In this step, a colorant is dispersed in a form of fine particles in an aqueous medium to obtain a dispersion of colorant particles.

The colorant can be dispersed using mechanical energy. The number-based median diameter of the colorant particles in the dispersion is preferably 10 to 300 nm, and more preferably 50 to 200 nm. The number-based median diameter of the colorant particles can be measured using an electrophoretic light scattering photometer "ELS-800" (manufactured by Otsuka Electronics Co., Ltd.).

The steps of association step (2) to external additive addition step (6) can be performed according to conventionally known various methods.

Note that the flocculant used in associative step (2) is not particularly limited, but is suitably selected from metal salts. Examples of the metal salts include: a monovalent metal salt such as an alkali metal salt of sodium, potassium, or lithium; a divalent metal salt of calcium, magnesium, manganese, or copper; and a trivalent metal salt of iron or aluminum. Specifically, examples of the metal salts include sodium chloride, potassium chloride, lithium chloride, calcium chloride, magnesium chloride, zinc chloride, copper sulfate, magnesium sulfate, and manganese sulfate. Above all, a divalent metal salt is particularly preferable because of being able to promote aggregation in a smaller amount. These compounds may be used singly or in combination of two or more types thereof.

[Developer]

The developer may be a one-component developer containing the above-described toner particles and a magnetic material, or may be a two-component developer containing the above-described toner particles and carrier particles.

Examples of the magnetic material contained in the one-component developer include magnetite, γ-hematite and various ferrites.

Examples of the carrier particles contained in the two-component developer include magnetic particles made of a conventionally known material such as a metal including iron, steel, nickel, cobalt, ferrite, and magnetite, or alloys of those metals with a metal such as aluminum or lead.

The carrier particles may be coated carrier particles obtained by coating surfaces of magnetic particles with a coating agent such as a resin, or may be binder dispersion type carrier particles obtained by dispersing magnetic material powder in a binder resin. Examples of the coating resin include an olefin resin, an acrylic resin, a styrene resin, a styrene acrylic resin, a silicone resin, a polyester resin, and a fluorocarbon resin. Examples of the resin constituting the resin dispersion type carrier particles include an acrylic resin, a styrene acrylic resin, a polyester resin, a fluorocarbon resin, and a phenol resin.

The volume-based median diameter of the carrier particles is preferably 20 to 100 μm, and more preferably 25 to 80 μm. The volume-based median diameter of the carrier particles can be typically measured with a laser diffraction type particle size distribution measuring device "HELOS" (manufactured by SYMPATEC GmbH) equipped with a wet type disperser.

The content of the toner particles in the developer is preferably 2 to 10% by mass with respect to 100% by mass of the total mass of the toner particles and the carrier particles.

[Image Forming Method]

The toner according to an embodiment of the present invention can be used in an electrophotographic image forming method, for example, a monochrome image forming method or a full color image forming method. In the full color image forming method, the toner according to an embodiment of the present invention can be applied to any image forming method such as a 4-cycle image forming method including four types of color developing devices for yellow, magenta, cyan, and black and one photoreceptor, or a tandem type image forming method in which an image forming unit including a color developing device for each color and a photoreceptor is mounted for each color.

That is, the image forming method according to an embodiment of the present invention includes step 1) of forming a toner image containing the toner according to an embodiment of the present invention on a recording medium, and step 2) of irradiating the formed toner image with light to fix the toner image on the recording medium.

Regarding Step 1)

In this step, a toner image containing the toner according to an embodiment of the present invention is formed on a recording medium.

(Recording Medium)

The recording medium is a member for holding a toner image. Examples of the recording medium include coated printing paper such as plain paper, high quality paper, art paper, or coated paper, commercially available Japanese paper or postcard paper, a resin film for OHP or a packaging material, and cloth.

The recording medium may have a sheet shape with a predetermined size, or may have a long shape to be wound into a roll after a toner image is fixed.

For example, by transferring a toner image on a photoreceptor onto a recording medium, the toner image can be formed as described later.

Regarding Step 2)

In this step, the formed toner image is irradiated with light to fix the toner image on the recording medium. Specifically, the toner image is irradiated with light to soften the toner image, and the toner image is thereby bonded onto the recording medium.

The wavelength of the irradiation light only needs to be able to sufficiently soften a toner image by photothermal conversion by the polymer (A) in the toner particles or the like, and is preferably 280 nm or more and less than 480 nm. The light irradiation amount is preferably 0.1 to 200 $J/cm^2$, more preferably 0.5 to 100 $J/cm^2$, and still more preferably 1.0 to 50 $J/cm^2$ from a similar viewpoint.

Light irradiation can be performed using a light source such as a light emitting diode (LED) or a laser light source as described later.

After step 2), as necessary, 3) a pressurization step of pressurizing the softened toner image may be further performed.

Regarding Step 3)

In this step, the softened toner image is pressurized.

A pressure for pressurizing the toner image is not particularly limited, but is preferably 0.01 to 1.0 MPa, and more preferably 0.05 to 0.5 MPa for the toner image transferred onto the recording medium. By setting the pressure to 0.01 MPa or more, the deformation amount of the toner image can be increased. Therefore, the contact area between the toner image and a recording sheet S increases, and an image intensity is easily further enhanced. By setting the pressure to 1.0 MPa or less, it is possible to suppress an excessive increase in gloss of an obtained image.

The pressurization step may be performed before or simultaneously with the step of irradiating a toner image with light to soften the toner image (step 2) described above). However, the pressurization step is preferably performed after light irradiation because a toner image in a softened state in advance can be pressurized and as a result, an image intensity is further enhanced.

The pressurization step may be performed while the toner image is heated.

The heating temperature of a toner image (surface temperature of a toner image at the time of heating) is preferably (Tg+20) to (Tg+100)° C., and more preferably (Tg+25) to (Tg+80)° C. when Tg represents the glass transition temperature of the toner. If the surface temperature of the toner image is (Tg+20)° C. or higher, the toner image is easily deformed by pressurization. If the surface temperature is (Tg+100)° C. or lower, hot offset is easily suppressed. Note that the hot offset refers to a phenomenon that a part of the toner is transferred to a pressurizing member such as a roller in the fixing step, and a toner layer is divided.

Before step 2), step 4) of preheating the toner image may be performed as necessary. By further performing step 4) of preheating the toner image before step 2) in this manner, sensitivity of the polymer (A) to light can be further enhanced. As a result, even if the polymer (A) is a polymer, the sensitivity to light is less likely to be impaired. Therefore, melting or softening of the toner image by light irradiation is easily promoted.

As described above, the toner according to an embodiment of the present invention contains toner particles containing the "polymer (A) having a number average molecular weight Mn of a certain value or more" or the "polymer (A2) obtained by polymerizing an azobenzene derivative (monomer) having a polymerizable group" as the polymer (A). Therefore, in step 2), an image intensity of an obtained toner image can be enhanced while the toner image is favorably melted or softened by light irradiation and fixed on the recording medium.

The image forming method according to an embodiment of the present invention can be performed, for example, by using the following image forming apparatus.

<Image Forming Apparatus>

FIG. 1 is a schematic configuration view illustrating an image forming apparatus 100. FIG. 1 illustrates an example of the monochrome image forming apparatus 100, but the present invention can also be applied to a color image forming apparatus. The present invention will be described with an example of using the recording sheet S as the recording medium, but is not limited thereto.

The image forming apparatus 100 includes an automatic document feeder 72, an image reader 71, a sheet conveyance system 7, an image forming unit 10, an irradiation unit 40, and a pressure bonding unit 9.

The automatic document feeder 72 includes a document table and a conveyance mechanism that conveys a document d set on the document table, and conveys the document d to the image reader 71.

The image reader 71 includes a scanning exposure device, an image sensor CCD, and an image processor 20. Then, the document d placed on the document table of the automatic document feeder 72 is conveyed to the image reader 71, scanned and exposed by an optical system of the scanning exposure device, and read by the image sensor CCD. An analog signal photoelectrically converted by the image sensor CCD is subjected to analog processing, A/D conversion, shading correction, image compression processing, and the like in the image processor 20 and then input to an exposure unit 3 of the image forming unit 10.

The sheet conveyance system 7 includes a plurality of trays 16, a plurality of sheet feeders 11, a conveyance roller 12, a conveyance belt 13, and the like. The trays 16 store the recording sheets S having determined sizes, respectively, operate the sheet feeders 11 of the trays 16 determined according to an instruction from a control unit 90, and supply the recording sheets S. The conveyance roller 12 conveys the recording sheet S fed from each of the trays 16 by each of the sheet feeders 11 or the recording sheet S carried from a manual sheet feeder 15 to the image forming unit 10.

Figure 2:
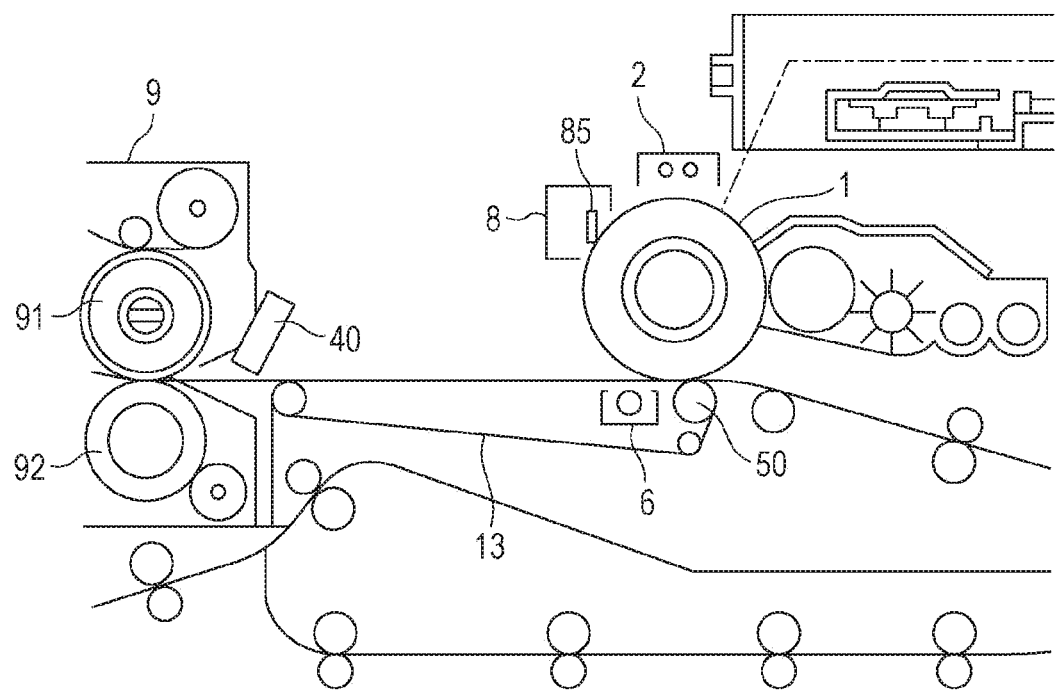
FIG. 2 is a partially enlarged view illustrating a peripheral configuration of an image forming unit, an irradiation unit, and a pressure bonding unit in FIG. 1.

FIG. 2 is a partially enlarged view illustrating a peripheral configuration of the image forming unit 10, the irradiation unit 40, and the pressure bonding unit 9 in FIG. 1.

In the image forming unit 10, a charger 2, the exposure unit 3, a developing unit 4, a transfer unit 5, a charge remover 6, and a cleaner 8 are disposed in this order around the photoreceptor 1 in a rotational direction of the photoreceptor 1.

The photoreceptor 1 is an image carrier having a surface with a photoconductive layer formed thereon, and is rotatable in an arrow direction in FIG. 1 by a driving device (not illustrated). Around the photoreceptor 1, a temperature and humidity meter 17 that detects a temperature and a humidity in the image forming apparatus 100 is disposed.

The charger 2 uniformly charges a surface of the photoreceptor 1 to uniformly charge the surface of the photoreceptor 1.

The exposure unit 3 includes a beam emitting source such as a laser diode, and irradiates the surface of the charged photoreceptor 1 with beam light to dissipate charges of a portion irradiated with the beam light, and forms an electrostatic latent image according to image data on the photoreceptor 1.

The developing unit 4 supplies a toner contained therein to the photoreceptor 1 to form a toner image based on the electrostatic latent image on the surface of the photoreceptor 1.

The transfer unit 5 is disposed so as to face the photoreceptor 1 via the recording sheet S, and transfers a toner image onto the recording sheet S.

The charge remover 6 removes charges on the photoreceptor 1 after the toner image is transferred.

The cleaner 8 includes a blade 85. The blade 85 cleans the surface of the photoreceptor 1 to remove the developer remaining on the surface of the photoreceptor 1.

The irradiation unit 40 is a light source that irradiates the toner image formed on the recording sheet S with light. Specifically, the irradiation unit 40 is disposed on a side of the photoreceptor 1 with respect to a surface of the recording sheet S nipped by the photoreceptor 1 and a transfer roller 50. The irradiation unit 40 is disposed between the nip position by the photoreceptor 1 and the transfer roller 50 and the pressure bonding unit 9 in a sheet conveyance direction.

Examples of the irradiation unit 40 include a light emitting diode (LED) and a laser light source. With the irradiation unit 40, the toner image containing the polymer (A) is melted or softened, and the toner image is fixed on the recording sheet S. The wavelength and irradiation amount of irradiation light are as described above.

The pressure bonding unit 9 is arbitrarily disposed, and applies only pressure or heat and pressure to the recording sheet S onto which the toner image has been transferred by pressurizing members 91 and 92 to perform a fixing treatment, and thereby fixes an image on the recording sheet S. The recording sheet S on which the image has been fixed is conveyed to a sheet discharger 14 by a conveyance roller and discharged through the sheet discharger 14 to the outside of the apparatus.

The image forming apparatus 100 further includes a sheet reversing unit 24. Due to this, the image forming apparatus 100 can convey the thermally fixed recording sheet S to the sheet reversing unit 24 before the sheet discharger 14, can turn the recording sheet S upside down, and can discharge the recording sheet S, or can convey the recording sheet S that has been turned upside down to the image forming unit 10 again and can form images on both sides of the recording sheet S.

An image forming method using the image forming apparatus illustrated in FIG. 1 will be described below.

First, a uniform potential is applied to the photoreceptor 1 by the charger 2 to charge the photoreceptor 1. Thereafter, the photoreceptor 1 is scanned with a light flux emitted by the exposure unit 3 based on original image data to form an electrostatic latent image. Next, a developer containing a compound that undergoes phase transition by light absorption is supplied onto the photoreceptor 1 by the developing unit 4.

When the recording sheet S is conveyed from the tray 16 to the image forming unit 10 in synchronization with the timing when a toner image carried on a surface of the photoreceptor 1 reaches the position of the transfer roller 50 by rotation of the photoreceptor 1, the toner image on the photoreceptor 1 is transferred onto the recording sheet S nipped by the transfer roller 50 and the photoreceptor 1 by a transfer bias applied to the transfer roller 50.

The transfer roller 50 also serves as a pressurizing member, and reliably brings the toner image into close contact with the recording sheet S while transferring the toner image from the photoreceptor 1 onto the recording sheet S.

After the toner image is transferred onto the recording sheet S, the blade 85 of the cleaner 8 removes the developer remaining on the surface of the photoreceptor 1.

In this manner, the recording sheet S onto which the toner image has been transferred is conveyed to the irradiation unit 40 and the pressure bonding unit 9 by the conveyance belt 13.

Then, the irradiation unit 40 irradiates the toner image transferred onto the recording sheet S with light (preferably light with a wavelength of 280 nm or more and less than 480 nm). By irradiating the toner image on the recording sheet S with light by the irradiation unit 40, the toner image can be melted and softened. Therefore, the toner image can be fixed to the recording sheet S.

When the recording sheet S holding the toner image reaches the pressure bonding unit 9 by the conveyance belt 13, the recording sheet S on which the toner image has been formed is pressure-bonded by the pressurizing members 91 and 92. The toner image is softened by light irradiation by the irradiation unit 40 before pressurization by the pressure bonding unit 9. Therefore, the toner image can be pressure-bonded to the recording sheet S with lower energy.

Pressure when the toner image is pressurized is as described above. Note that the pressurization step may be performed before, simultaneously with, or after the step of irradiating a toner image with light to soften the toner image. The pressurization step is preferably performed after light irradiation from a viewpoint of being able to pressurize the toner image in a softened state in advance and easily enhancing an image intensity.

The pressurizing member 91 can heat a toner image on the recording sheet S when the recording sheet S passes between the pressurizing members 91 and 92. The toner image softened by light irradiation is further softened by this heating, and as a result, fixability (image intensity) of the toner image to the recording sheet S is further improved.

The heating temperature of the toner image is as described above. The heating temperature of the toner image (surface temperature of the toner image) can be measured with a non-contact temperature sensor. Specifically, for example, it is only required to dispose a non-contact temperature sensor at a position where the recording medium is discharged from the pressurizing member, and to measure the surface temperature of the toner image on the recording medium.

The toner image pressure-bonded by the pressurizing members 91 and 92 is solidified and fixed onto the recording sheet S.

EXAMPLES

Hereinafter, the present invention will be specifically described with reference to Examples, but the present invention is not limited thereto.

1. Preparation of Toner Material (1) Preparation of Azobenzene Group-Containing Compound <Synthesis of Azobenzene Derivative Monomer 1>

[Chemical formula 14]

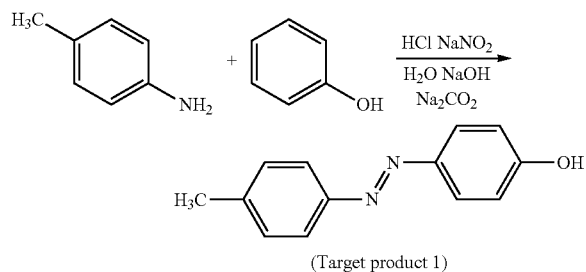

(Target product 1)

In a 300 ml three-neck flask, 6.44 g (0.933 mol) of sodium nitrite was dissolved in 20 ml of water, and the resulting solution was cooled until the internal temperature thereof reached 0° C. To this solution, 5 g (0.047 mol) of p-toluidine and 23 g of a 0.2 N hydrochloric acid aqueous solution were slowly added dropwise at an internal temperature of 5° C. or lower. After dropwise addition, the resulting mixture was stirred for 30 minutes while the internal temperature thereof was maintained.

To the resulting solution, a solution obtained by dissolving 5.71 g (0.06 mol) of phenol, 2.43 g (0.06 mol) of sodium hydroxide, and 6.43 g (0.06 mol) of sodium carbonate in 20 ml of water was slowly added dropwise while the internal temperature thereof was maintained at 5° C. or lower to precipitate a yellow crystal. After completion of the dropwise addition, the resulting mixture was stirred for 30 minutes while the internal temperature thereof was maintained, then filtered, and washed with cold water to obtain an orange crystal. This crystal was dried and then purified with a silica gel column (ethyl acetate/heptane=1/4) to obtain 9.7 g (yield 97.9%) of target product 1 (4-(p-toluyldiazenyl) phenol).

[Chemical formula 15]

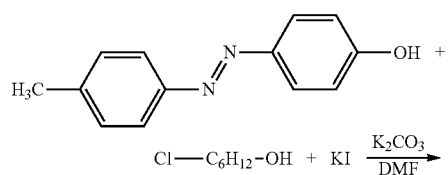

Cl—C$_6$H$_{12}$—OH + KI $\xrightarrow{\text{K}_2\text{CO}_3}{\text{DMF}}$

-continued

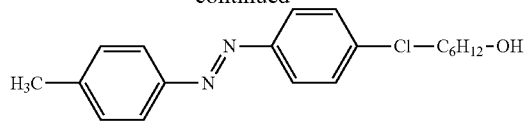

(Target product 2)

In a 200 ml four-neck flask, 5 g (0.024 mol) of the obtained target product 1 (4-(p-toluyldiazenyl) phenol) was dissolved in 25 ml of dimethyl formamide (DMF). To the resulting solution, 4.88 g (0.035 mol) of potassium carbonate was added, and the resulting mixture was stirred for 30 minutes while being maintained at 30° C. To this solution, 10.2 mg (0.06 mmol) of potassium iodide and 3.54 g (0.026 mol) of 6-chloro-1-hexanol were added and caused a reaction therebetween at 110° C. for three hours. The resulting product was cooled to room temperature, added to 650 g of ice, and then filtered. A crystal was dispersed in 400 ml of water, stirred overnight, washed, filtered, and dried.

The resulting product was recrystallized with ethanol to obtain 6.41 g (yield 87.1%) of an orange crystal (target product 2: 6-(4-(p-toluylazenyl) phenoxy) hexan-1-ol)).

[Chemical formula 16]

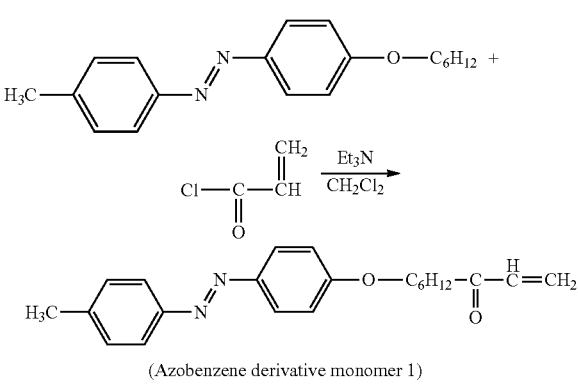

(Azobenzene derivative monomer 1)

Into a 100 ml four-neck flask, 3 g (0.001 mol) of the target product 2 (6-(4-(p-toluylazenyl)phenoxy) hexan-1-ol), 1.34 ml (0.001 mol) of triethylamine, and 30 ml of dichloromethane were put. At this time, the raw materials were in a dispersed state. A solution obtained by dissolving 1.04 g (0.011 mol) of acrylic acid chloride in 10 ml of dichloromethane while the internal temperature thereof was maintained at 0° C. was added dropwise while the internal temperature thereof was maintained at 0 to 5° C. As the dropwise addition advanced, the raw materials were dissolved.

After completion of the dropwise addition, the temperature of the reaction solution was returned to room temperature, and the reaction solution was stirred for five hours. After completion of the reaction, dichloromethane was concentrated and removed. The residue was dissolved in ethyl acetate, and washed with dilute hydrochloric acid, a sodium hydrogen carbonate aqueous solution, and a saturated salt solution. An organic layer was dried over magnesium sulfate and then concentrated. The obtained orange crystal was purified with a silica gel column (ethyl acetate/heptane=1/5) to obtain 2.87 g (51.4%) of azobenzene derivative monomer 1.

<Synthesis of Polymer 1>

In a 100 ml four-neck flask, 1.5 g (4.096 mmol) of the obtained azobenzene derivative monomer 1, 5 mg (0.023 mmol) of 4-cyanopentanoic acid dithiobenzoate, and 1 mg (0.006 mmol) of AIBN were dissolved in 4 ml of anisole. Then, freeze degassing was performed to obtain an argon gas atmosphere. Thereafter, the temperature was raised to 75° C., and the solution was stirred for 48 hours to perform polymerization. To the polymer solution, 40 ml of methanol was gradually added dropwise. Thereafter, THF was added thereto to remove the unreacted azobenzene derivative monomer 1. The separated polymer solution was dried in a vacuum drying furnace at 40° C. for 24 hours to obtain a polymer 1.

[Chemical formula 17]

Polymer 1

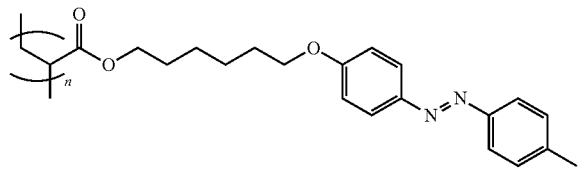

<Synthesis of Polymer 2>

A polymer 2 was obtained in a similar manner to the polymer 1 except that the degree of polymerization was changed such that the number average molecular weight was 2950.

<Synthesis of Polymer 3>

An azobenzene derivative monomer was obtained in a similar manner to the azobenzene derivative monomer 1 except that acrylic acid chloride was changed to methacrylic acid chloride.

A polymer 3 represented by the following formula was obtained in a similar manner to the polymer 1 except that the obtained azobenzene derivative monomer was used.

[Chemical formula 18]

Polymer 3

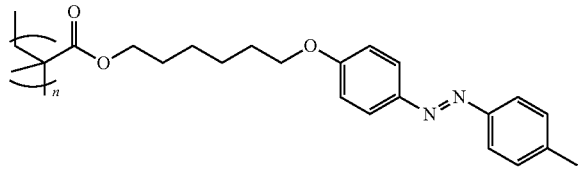

<Synthesis of Polymer 4>

An azobenzene derivative monomer was obtained in a similar manner to the azobenzene derivative monomer 1 except that 4-(p-toluyldiazenyl) phenol was changed to 4-phenylazophenol.

A polymer 4 represented by the following formula was obtained in a similar manner to the polymer 1 except that the obtained azobenzene derivative monomer was used.

[Chemical formula 19]

Polymer 4

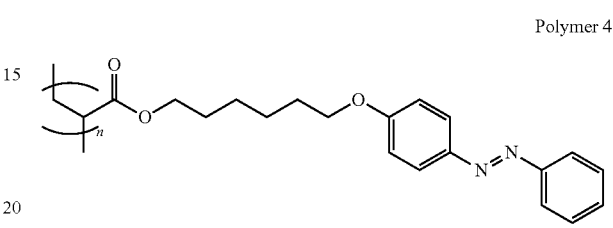

<Synthesis of Polymer 5>

An azobenzene derivative monomer was obtained in a similar manner to the azobenzene derivative monomer 1 except that 4-(p-toluyldiazenyl) phenol was changed to 4-(4-nitrophenylazo) phenol.

A polymer 5 represented by the following formula was obtained in a similar manner to the polymer 1 except that the obtained azobenzene derivative monomer was used.

[Chemical formula 20]

Polymer 5

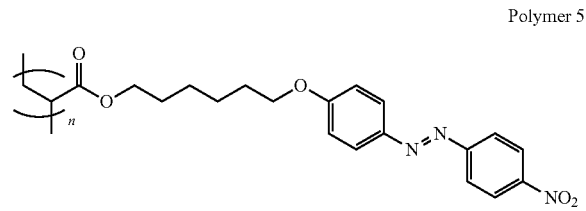

<Synthesis of Polymer 6>

An azobenzene derivative monomer was obtained in a similar manner to the azobenzene derivative monomer 1 except that p-toluidine was changed to 4-ethylaniline and 6-chloro-1-hexanol was changed to 6-chloro-1-octanol.

A polymer 6 represented by the following formula was obtained in a similar manner to the polymer 1 except that the obtained azobenzene derivative monomer was used.

[Chemical formula 21]

Polymer 6

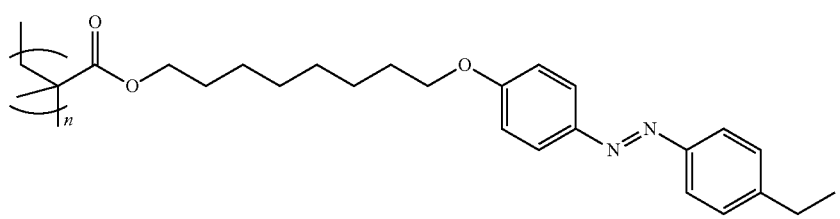

<Synthesis of Polymer 7>

An azobenzene derivative monomer was obtained in a similar manner to the azobenzene derivative monomer 1 except that p-toluidine was changed to 4-hexylaniline.

A polymer 7 was obtained in a similar manner to the polymer 1 except that the obtained azobenzene derivative monomer was used.

[Chemical formula 14]

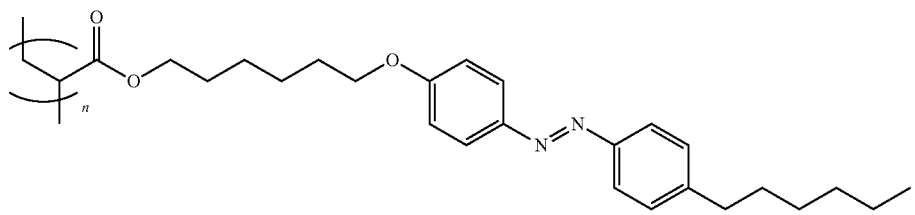

<Synthesis of Polymer 8>

An azobenzene derivative monomer was obtained in a similar manner to the azobenzene derivative monomer 1 except that phenol was changed to 6-phenyl-1-hexanol.

A polymer 8 represented by the following formula was obtained in a similar manner to the polymer 1 except that the obtained azobenzene derivative monomer was used.

[Chemical formula 22]

Polymer 8

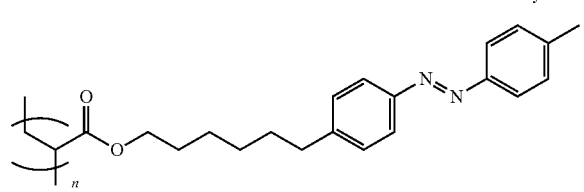

<Synthesis of Polymer 9>

An azobenzene derivative monomer was obtained in a similar manner to the azobenzene derivative monomer 1 except that p-toluidine was changed to m-toluidine.

A polymer 9 represented by the following formula was obtained in a similar manner to the polymer 1 except that the obtained azobenzene derivative monomer was used.

[Chemical formula 23]

Polymer 9

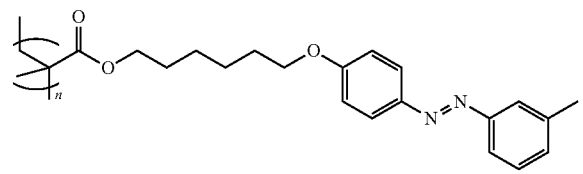

<Synthesis of Polymer 10>

An azobenzene derivative monomer was obtained in a similar manner to the azobenzene derivative monomer 1 except that p-toluidine was changed to o-toluidine.

A polymer 10 represented by the following formula was obtained in a similar manner to the polymer 1 except that the obtained azobenzene derivative monomer was used.

[Chemical formula 24]

Polymer 10

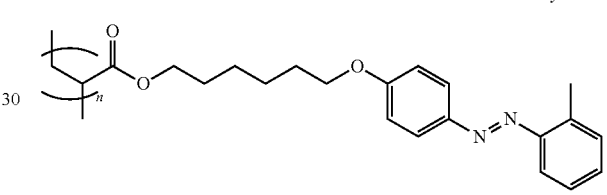

<Synthesis of Polymer 11>

A copolymer (polymer 11) of an azobenzene derivative and a styrene derivative was obtained in a similar manner to the polymer 1 except that the azobenzene derivative monomer 1 used for polymerization of the polymer 1 and a styrene monomer were copolymerized at 80:20 (molar ratio).

[Chemical formula 25]

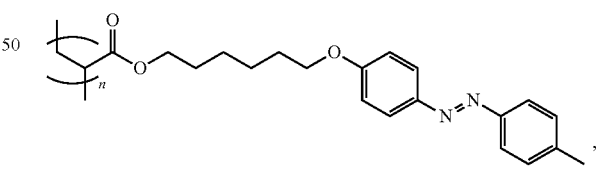

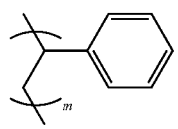

<Synthesis of Polymer 12>

In 74 ml of ethanol, 2.1 g of 4-methyl-4'-hydroxyazobenzene, 2.0 g of bromohexanoic acid, and 1.0 g of potassium hydroxide were dissolved, and the resulting solution was stirred at 100° C. for three days. The resulting solution was neutralized with hydrochloric acid and acetic acid. A precipitate was filtered out and washed with water. The resulting product was subjected to chromatographic column separation with chloroform and ethyl acetate (9:1) to obtain 1.5 g of 7-[4-(4-methylphenylazo) phenoxy] hexanoic acid.

In 3 ml of dehydrated dichloromethane, 0.45 g of 7-[4-(4-methylphenylazo) phenoxy] hexanoic acid was dissolved, and 1 ml of thionyl chloride was added thereto. The resulting solution was heated under reflux for one hour. Thereafter, the solvent and thionyl chloride were distilled off, and 5 ml of dehydrated dichloromethane was added to the remaining solution. This solution was slowly added to a suspension containing 20 mg of polyvinyl alcohol and 3 ml of dehydrated pyridine. The resulting solution was stirred at room temperature for four days. The resulting solution was subjected to chromatographic column separation in a dark place using a mixed solvent of dichloromethane, hexane, and ethyl acetate (25:25:1) as a developing solvent to obtain a polymer 12.

[Chemical formula 26]

Polymer 12

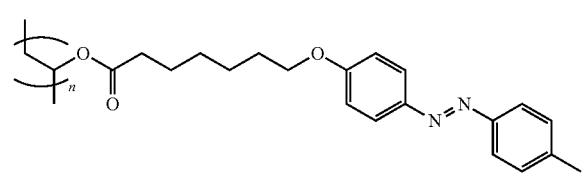

<Synthesis of Polymer 13>

A polymer 13 represented by the following formula was obtained in a similar manner to the polymer 12 except that bromohexanoic acid was changed to bromoacetic acid.

[Chemical formula 27]

Polymer 13

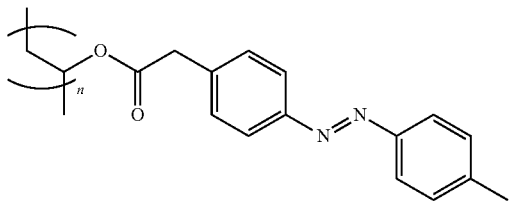

The structures and number average molecular weights of the obtained polymers 1 to 13 are illustrated in Table 1. Note that formulas (1), (5), and (6) in Table 1 indicate the following, respectively.

[Chemical formula 28]

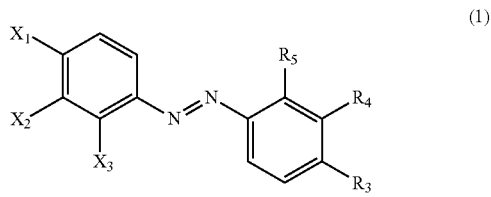
(1)

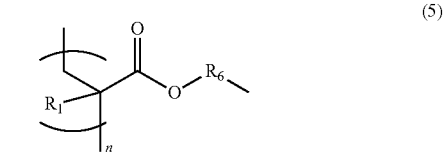
(5)

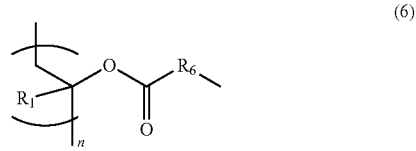
(6)

TABLE 1

| Polymer No. | $X_1$ to $X_3$ in formula (1) | | | $R_6$ | | | $R_3$ to $R_5$ in formula (1) | | Number average molecular weight Mn | Note |
|---|---|---|---|---|---|---|---|---|---|---|
| | Type | Position* | Type | $R_1$ Type | Type | Carbon number | Position* | Type | | |
| 1 | Polymer (A1) | $X_1$ (p-position) | Formula (5) | Hydrogen atom | Alkoxylene group | 6 | $R_3$ (p-position) | Methyl group | 9600 | Polymerization reaction of azobenzene derivative monomer |
| 2 | | $X_1$ (p-position) | | Hydrogen atom | Alkoxylene group | 6 | $R_3$ (p-position) | Methyl group | 2950 | |
| 3 | | $X_1$ (p-position) | | Methyl group | Alkoxylene group | 6 | $R_3$ (p-position) | Methyl group | 6000 | |
| 4 | | $X_1$ (p-position) | | Hydrogen atom | Alkoxylene group | 6 | $R_3$ (p-position) | Hydrogen atom | 8800 | |
| 5 | | $X_1$ (p-position) | | Hydrogen atom | Alkoxylene group | 6 | $R_3$ (p-position) | Nitro group | 4800 | |
| 6 | | $X_1$ (p-position) | | Hydrogen atom | Alkoxylene group | 8 | $R_3$ (p-position) | Ethyl group | 14000 | |
| 7 | | $X_1$ (p-position) | | Hydrogen atom | Alkoxylene group | 6 | $R_3$ (p-position) | Hexyl group | 17000 | |
| 8 | | $X_1$ (p-position) | | Hydrogen atom | Alkylene group | 6 | $R_3$ (p-position) | Methyl group | 18000 | |
| 9 | | $X_2$ (m-position) | | Hydrogen atom | Alkoxylene group | 6 | $R_4$ (m-position) | Methyl group | 15000 | |
| 10 | | $X_2$ (m-position) | | Hydrogen atom | Alkoxylene group | 6 | $R_5$ (o-position) | Methyl group | 17000 | |
| 11 | | $X_1$ (p-position) | | Copolymer of azobenzene derivative of polymer 1 and styrene monomer | | | | | 5500 | |

TABLE 1-continued

| Polymer | | | | | | | | | Number average molecular weight | |
|---|---|---|---|---|---|---|---|---|---|---|
| | | $X_1$ to $X_3$ in formula (1) | | | | | $R_3$ to $R_5$ in formula (1) | | | |
| | | | | $R_1$ | | $R_6$ | | | | |
| | | | | | | Carbon | | | | |
| No. | Type | Position* | Type | Type | Type | number | Position* | Type | Mn | Note |
| 12 | Polymer (A2) | $X_1$ (p-position) | Formula (6) | Hydrogen atom | Alkoxylene group | 7 | $R_3$ (p-position) | Methyl group | 5200 | Reaction between |
| 13 | | $X_1$ (p-position) | | Hydrogen atom | Alkylene group | 2 | $R_3$ (p-position) | Hydrogen atom | 4200 | PVA and azobenzene derivative |

*Position indicates a substitution position to an azo group.

<Comparative Compound>
The following comparative compound 1 (number average molecular weight Mn: 2870) was obtained by a method described in paragraphs 0217 to 0227 of JP 2014-191078 A.

[Chemical formula 29]

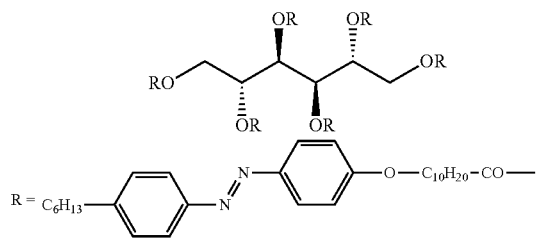

The number average molecular weights Mn of the polymers 1 to 13 and the comparative compound were measured by the following method.
(Number Average Molecular Weight Mn)
The number average molecular weights Mn of the polymers 1 to 13 and the comparative compound were measured by a GPC method. Specifically, tetrahydrofuran (THF) was caused to flow as a carrier solvent at a flow rate of 0.2 mL/min while a column temperature was maintained at 40° C. using a device "HLC-8120GPC" (manufactured by Tosoh Corporation) and a column "TSK guard column+TSK gel Super HZ-M triplicate" (manufactured by Tosoh Corporation). A measurement sample (polymer or comparative compound) was dissolved in tetrahydrofuran so as to have a concentration of 1 mg/ml. The solution was prepared by performing a treatment at room temperature for five minutes using an ultrasonic disperser. Subsequently, the solution was treated with a membrane filter with a pore size of 0.2 μm to obtain a sample solution. Thereafter, 10 μL of the sample solution was injected into the device together with the carrier solvent and detected using a refractive index detector (RI detector). Based on a calibration curve created using monodispersed polystyrene standard particles, a molecular weight distribution of the measurement sample was calculated. Ten points were used as polystyrene for the calibration curve measurement.
(2) Preparation of Polymer Particle Dispersion
<Preparation of Polymer Particle Dispersion 1>
80 parts by mass of dichloromethane and 20 parts by mass of the polymer 1 were mixed and stirred while being heated at 50° C. to obtain a solution containing the polymer 1. To 100 parts by mass of the obtained solution, a mixed solution of 99.5 parts by mass of distilled water warmed to 50° C. and 0.5 parts by mass of a 20% by mass sodium dodecylbenzene sulfonate aqueous solution was added. Thereafter, the resulting mixture was stirred at 16000 rpm for 20 minutes with a homogenizer (manufactured by Heidolph Instruments) equipped with a shaft generator 18F and emulsified to obtain an emulsion of the polymer 1.
The obtained emulsion was put into a separable flask, and heated and stirred at 40° C. for 90 minutes while nitrogen was fed into a gas phase, and the organic solvent was removed to obtain a polymer particle dispersion 1. The particle diameter of a polymer particle in the polymer particle dispersion 1 was measured using an electrophoretic light scattering photometer "ELS-800" (manufactured by Otsuka Electronics Co., Ltd.) and found to be 189 nm in terms of a mass average particle diameter.
<Preparation of Polymer Particle Dispersions 2, 4, 6, 8, 9, 11, and 12>
The polymer particle dispersions 2, 4, 6, 8, 9, 11, and 12 were obtained in a similar manner to preparation of the polymer particle dispersion 1 except that the polymer 1 was changed to the polymers 2, 4, 6, 8, 9, 11, and 12, respectively.
<Preparation of Comparative Compound Dispersion>
A comparative compound dispersion was obtained in a similar manner to preparation of the polymer particle dispersion 1 except that the polymer 1 was changed to a comparative compound.
(3) Preparation of Binder Resin Particle Dispersion
<Preparation of Styrene Acrylic Resin Particle Dispersion>
(First Stage Polymerization)
Into a reaction container equipped with a stirrer, a temperature sensor, a cooling tube, and a nitrogen introducing device, a solution obtained by dissolving 8 parts by mass of sodium dodecylsulfate in 3000 parts by mass of deionized water was put. While the solution was stirred at a stirring speed of 230 rpm under a nitrogen flow, the internal temperature thereof was raised to 80° C. After the temperature rise, a solution obtained by dissolving 10 parts by mass of potassium persulfate in 200 parts by mass of deionized water was added thereto. The temperature of the resulting solution was set to 80° C. again. A polymerizable monomer solution containing 480 parts by mass of styrene, 250 parts by mass of n-butyl acrylate, 68.0 parts by mass of methacrylic acid, and 16.0 parts by mass of n-octyl-3-mercaptopropionate was added dropwise thereto over one hour. Thereafter, the resulting mixture was heated at 80° C. for two hours and stirred to perform polymerization, thus preparing a styrene acrylic resin particle dispersion (1A) containing styrene acrylic resin particles (1a).

(Second Stage Polymerization)

Into a reaction container equipped with a stirrer, a temperature sensor, a cooling tube, and a nitrogen introducing device, a solution obtained by dissolving 7 parts by mass of sodium polyoxyethylene (2) dodecyl ether sulfate in 800 parts by mass of deionized water was put. The solution was heated to 98° C. Thereafter, a polymerizable monomer solution obtained by dissolving 260 parts by mass of the styrene acrylic resin particle dispersion (1A) obtained above, 245 parts by mass of styrene, 120 parts by mass of n-butyl acrylate, 1.5 parts by mass of n-octyl-3-mercaptopropionate, and 67 parts by mass of a paraffin wax "HNP-11" (manufactured by Nippon Seiro Co., Ltd.) as a release agent at 90° C. was added thereto. The solution was mixed and dispersed for one hour with a mechanical disperser "CREAMIX (registered trademark)" (manufactured by M. Technique Co., Ltd.) having a circulation path to prepare a dispersion containing emulsified particles (oil droplets). Subsequently, an initiator solution obtained by dissolving 6 parts by mass of potassium persulfate in 200 parts by mass of deionized water was added to the dispersion, and the system was heated and stirred at 82° C. for one hour to perform polymerization, thus preparing a styrene acrylic resin particle dispersion (1B) containing styrene acrylic resin particles (1b).

(Third Stage Polymerization)

To the obtained styrene acrylic resin particle dispersion (1B), a solution obtained by dissolving 11 parts by mass of potassium persulfate in 400 parts by mass of deionized water was added. Subsequently, under a temperature condition of 82° C., a polymerizable monomer solution containing 435 parts by mass of styrene, 130 parts by mass of n-butyl acrylate, 33 parts by mass of methacrylic acid, and 8 parts by mass of n-octyl 3-mercaptopropionate was added dropwise thereto over one hour. After completion of the dropwise addition, the resulting mixture was heated and stirred for two hours to perform polymerization and then cooled to 28° C. to obtain a styrene acrylic resin particle dispersion 1 containing a styrene acrylic resin 1. The glass transition temperature (Tg) of the styrene acrylic resin 1 was measured and found to be 45° C.

<Preparation of Polyester Resin Particle Dispersion>

Into a 10 liter four-neck flask equipped with a nitrogen introducing tube, a dehydration tube, a stirrer, and a thermocouple, 524 parts by mass of bisphenol A propylene oxide 2 mol adduct, 105 parts by mass of terephthalic acid, 69 parts by mass of fumaric acid, and 2 parts by mass of tin octylate (esterification catalyst) were put, and were subjected to a polycondensation reaction at a temperature of 230° C. for eight hours. Furthermore, the polycondensation reaction was continued at 8 kPa for one hour, and then cooled to 160° C. to obtain a polyester resin 1. 100 parts by mass of the polyester resin 1 was crushed with "Lander mill type: RM" (manufactured by Tokuju Corporation) and mixed with 638 parts by mass of a 0.26% by mass of a sodium dodecyl sulfate aqueous solution prepared in advance. The resulting mixture was ultrasonically dispersed at V-LEVEL at 300 µA for 30 minutes using a homogenizer "US-150T" (manufactured by Nihonseiki Kaisha Ltd.) while being stirred to obtain a polyester resin particle dispersion 1. The glass transition temperature (Tg) of the polyester resin 1 was measured and found to be 42° C.

2. Preparation of Toner Particles

<Manufacture of Toner Particles 1 to 6>

Each of the polymers illustrated in Table 2 was roughly crushed with a hammer mill such that the particle diameter was 1 mm or less, and then finely crushed with a collision type air flow crusher using a high pressure gas to obtain a crushed product. Next, the fine powder and the coarse powder were simultaneously classified and removed using a Classiel (high efficiency precision air flow classifier, manufactured by Seishin Enterprise Co., Ltd.) to obtain each of toner particles 1 to 6.

<Manufacture of Toner Particles 7>

Into a reaction device equipped with a stirrer, a temperature sensor, and a cooling tube, 504 parts by mass of the polymer particle dispersion 1 manufactured above in terms of solid content, 216 parts by mass of the styrene acrylic resin particle dispersion 1 (polymer:styrene acrylic resin=70:30 mass ratio) in terms of solid content, and 900 parts by mass of deionized water were put. The temperature in the container was maintained at 30° C., and a 5 mol/L sodium hydroxide aqueous solution was added thereto to adjust the pH to 10.

Next, an aqueous solution obtained by dissolving 2 parts by mass of magnesium chloride hexahydrate in 1000 parts by mass of deionized water was added dropwise thereto over 10 minutes while being stirred. Thereafter, the temperature of this system started to be raised, and this system was heated to 70° C. over 60 minutes. A particle growth reaction was continued while the temperature was maintained at 70° C. In this state, the particle diameter of an associated particle was measured with "Multisizer 3" (manufactured by Beckman Coulter, Inc.). When the volume-based median diameter (D50) reached 6.5 µm, an aqueous solution obtained by dissolving 190 parts by mass of sodium chloride in 760 parts by mass of deionized water was added thereto to stop the particle growth. The resulting solution was stirred at 70° C. for one hour. Thereafter, the temperature was further raised. The solution was heated and stirred at 75° C. to promote fusion of the particles. Thereafter, the solution was cooled to 30° C. to obtain a dispersion of toner particles.

The obtained dispersion of toner particles was subjected to solid-liquid separation with a centrifuge to form a wet cake of toner particles. The wet cake was washed with deionized water at 35° C. using a centrifuge until the electric conductivity of a filtrate reached 5 µS/cm, then transferred to a "flash jet dryer" (manufactured by Seishin Enterprise Co., Ltd.), and dried until the water content reached 0.5% by mass to manufacture toner particles.

To the obtained toner particles, 1% by mass of hydrophobic silica (number average primary particle diameter=12 nm) and 0.3% by mass of hydrophobic titania (number average primary particle diameter=20 nm) were added and mixed using a Henschel mixer to obtain toner particles 7.

<Manufacture of Toner Particles 8 to 22>

Toner particles 8 to 22 were obtained in a similar manner to the particles 7 except that the combination and mixing ratio of the binder resin particle dispersion and the azobenzene group-containing compound dispersion were changed such that the combination and content ratio of the binder resin and the azobenzene group-containing compound were as illustrated in Table 2.

The volume-based median diameters (D50) of the obtained toner particles 1 to 22 (average particle diameter of toner particles) were measured using "Coulter Counter 3 (manufactured by Beckman Coulter, Inc.)". Table 2 illustrates results thereof.

TABLE 2

| Toner No. | Polymer No. | Comparative compound | Azobenzene group-containing compound Number average molecular weight Mn | Binder resin | Azobenzene group-containing compound: Binder resin (mass ratio) | Average particle diameter (μm) |
|---|---|---|---|---|---|---|
| 1 | 1 | — | 9600 | — | 100:0 | 10.8 |
| 2 | 3 | — | 6000 | — | 100:0 | 11.5 |
| 3 | 4 | — | 8800 | — | 100:0 | 11.2 |
| 4 | 6 | — | 14000 | — | 100:0 | 12.3 |
| 5 | 8 | — | 18000 | — | 100:0 | 11.1 |
| 6 | 11 | — | 5500 | — | 100:0 | 9.8 |
| 7 | 1 | — | 9600 | Styrene acrylic resin | 70:30 | 10.0 |
| 8 | 1 | — | 9600 | Styrene acrylic resin | 20:80 | 9.7 |
| 9 | 1 | — | 9600 | Polyester resin | 20:80 | 10.1 |
| 10 | 11 | — | 5500 | Styrene acrylic resin | 20:80 | 9.1 |
| 11 | 11 | — | 5500 | Polyester resin | 20:80 | 9.5 |
| 12 | 2 | — | 2950 | Styrene acrylic resin | 20:80 | 10.1 |
| 13 | 3 | — | 6000 | Styrene acrylic resin | 20:80 | 9.5 |
| 14 | 5 | — | 4800 | Styrene acrylic resin | 20:80 | 9.2 |
| 15 | 7 | — | 17000 | Styrene acrylic resin | 20:80 | 9.6 |
| 16 | 9 | — | 15000 | Styrene acrylic resin | 20:80 | 9.3 |
| 17 | 10 | — | 17000 | Styrene acrylic resin | 20:80 | 9.5 |
| 18 | 12 | — | 5200 | Styrene acrylic resin | 20:80 | 9.6 |
| 19 | 13 | — | 4200 | Styrene acrylic resin | 20:80 | 9.3 |
| 20 | — | 1 | 2870 | — | 100:0 | 10.2 |
| 21 | — | 1 | 2870 | Styrene acrylic resin | 70:30 | 9.7 |
| 22 | — | 1 | 2870 | Styrene acrylic resin | 20:80 | 9.2 |

3. Image Forming Method

Examples 1 to 24 and Comparative Examples 1 to 3

(Preparation of Developer)

Ferrite carrier particles coated with a copolymer resin of cyclohexane methacrylate and methyl methacrylate (monomer mass ratio 1:1) and having a volume average particle diameter of 30 μm were mixed with each of the toner particles 1 to 22 manufactured above such that a toner particle concentration was 6% by mass to obtain each of developers 1 to 19. Mixing was performed for 30 minutes using a V-type mixer.

(Image Formation)

Using each of the obtained developers 1 to 22, a toner image was formed on plain paper as a recording medium to obtain a printed matter.

Specifically, each of the developers was disposed between a pair of parallel flat plate (aluminum) electrodes with the developer on one side and plain paper (basis weight: 64 g/m$^2$) on the other side while being slid by a magnetic force. A toner was developed under a condition that a gap between the electrodes was 0.5 mm and the toner attachment amount in each of a DC bias and an AC bias was 4 g/m$^2$. A toner layer was formed on a surface of the plain paper and fixed with a fixing device to obtain a printed matter.

(Fixability Test)

A 1 cm square toner image of the printed matter was rubbed ten times with "JK Wiper (registered trademark)" (manufactured by Nippon Paper Crecia Co., Ltd.) while a pressure of 30 kPa was applied thereto, and a fixing ratio of the image was evaluated. An image having a fixing ratio of 60% or higher was evaluated to be acceptable. Note that the fixing ratio of an image is a numerical value obtained by measuring a reflection density of the image after printing and the image after rubbing with a fluorescence spectrophotometer "FD-7" (manufactured by Konica Minolta Inc.), dividing the reflection density of the solid image after rubbing by the reflection density of the solid image after printing, and expressing the obtained value as a percentage. The fixing ratio of an image was measured under a normal temperature and normal humidity environment (temperature 20° C. and relative humidity 50% RH).

As the fixing device, three types of fixing devices having similar configurations to FIG. 2 except that the following points were changed were used.

No. 1:

A fixing device does not include the pressure bonding unit 9 in FIG. 2, and includes the irradiation unit 40 that emits an ultraviolet light having a wavelength of 365 nm (light source: LED light source with emission wavelength of 365 nm±10 nm) and having an irradiation amount of 10 J/cm$^2$.

No. 2:

A fixing device includes the pressure bonding unit 9 in FIG. 2, includes the pressurizing member 91 having a temperature of 20° C., and applies a pressure of 0.2 MPa at the time of pressurization. The light source and the irradiation amount of the irradiation unit 40 are similar to those in No. 1.

No. 3:

A fixing device includes the pressure bonding unit 9 in FIG. 2, includes the pressurizing member 91 having a temperature of 80° C., and applies a pressure of 0.2 MPa at the time of pressurization. The light source and the irradiation amount of the irradiation unit 40 are similar to those in No. 1.

Table 3 illustrates evaluation results of Examples 1 to 24 and Comparative Examples 1 to 3.

TABLE 3

| | Composition of toner | | | | | | |
|---|---|---|---|---|---|---|---|
| | Toner No. | Azobenzene group-containing compound | | Binder resin | Azobenzene group-containing compound: Binder resin (mass ratio) | Average particle diameter (μm) | Fixing device Device No. | Evaluation Fixability test (%) |
| | (Developer No.) | Polymer No. | Comparative compound | | | | | |
| Example 1 | 1 | 1 | | — | 100:0 | 10.8 | 1 | 75 |
| Example 2 | 2 | 3 | | — | 100:0 | 11.5 | 1 | 75 |
| Example 3 | 3 | 4 | | — | 100:0 | 11.2 | 1 | 74 |
| Example 4 | 4 | 6 | | — | 100:0 | 12.3 | 1 | 75 |
| Example 5 | 5 | 8 | | — | 100:0 | 11.1 | 1 | 72 |
| Example 6 | 6 | 11 | | — | 100:0 | 9.8 | 1 | 79 |
| Example 7 | 7 | 1 | | Styrene acrylic resin | 70:30 | 10.0 | 1 | 77 |
| Example 8 | 8 | 1 | | Styrene acrylic resin | 20:80 | 9.7 | 1 | 81 |
| Example 9 | 9 | 1 | | Polyester resin | 20:80 | 10.1 | 1 | 78 |
| Example 10 | 10 | 11 | | Styrene acrylic resin | 20:80 | 9.1 | 1 | 84 |
| Example 11 | 11 | 11 | | Polyester resin | 20:80 | 9.5 | 1 | 82 |
| Example 12 | 1 | 1 | | — | 100:0 | 10.8 | 2 | 78 |
| Example 13 | 2 | 3 | | — | 100:0 | 11.5 | 2 | 77 |
| Example 14 | 7 | 1 | | Styrene acrylic resin | 70:30 | 10.0 | 2 | 81 |
| Example 15 | 8 | 1 | | Styrene acrylic resin | 20:80 | 9.7 | 2 | 86 |
| Example 16 | 13 | 3 | | Styrene acrylic resin | 20:80 | 9.5 | 2 | 85 |
| Example 17 | 8 | 1 | | Styrene acrylic resin | 20:80 | 9.6 | 3 | 94 |
| Example 18 | 12 | 2 | | Styrene acrylic resin | 20:80 | 10.1 | 3 | 70 |
| Example 19 | 14 | 5 | | Styrene acrylic resin | 20:80 | 9.2 | 3 | 91 |
| Example 20 | 15 | 7 | | Styrene acrylic resin | 20:80 | 9.6 | 3 | 85 |
| Example 21 | 16 | 9 | | Styrene acrylic resin | 20:80 | 9.3 | 3 | 93 |
| Example 22 | 17 | 10 | | Styrene acrylic resin | 20:80 | 9.5 | 3 | 91 |
| Example 23 | 18 | 12 | | Styrene acrylic resin | 20:80 | 9.6 | 3 | 91 |
| Example 24 | 19 | 13 | | Styrene acrylic resin | 20:80 | 9.3 | 3 | 90 |
| Comparative Example 1 | 20 | | 1 | — | 100:0 | 10.2 | 1 | 7 |
| Comparative Example 2 | 21 | | 1 | Styrene acrylic resin | 70:30 | 9.7 | 1 | 12 |
| Comparative Example 3 | 22 | | 1 | Styrene acrylic resin | 20:80 | 9.2 | 3 | 41 |

As illustrated in Table 3, it can be seen that the printed matters of Examples 1 to 24 using toners containing the polymers 1 to 19 (as azobenzene group-containing compounds) have high fixing ratios of toner images.

Particularly, it can be seen that the lower the carbon atom number of an alkyl group of $R_3$ in the polymer (A) is, the higher the fixing ratio of a toner image is (comparison between Examples 1 and 3 and comparison between Examples 17 and 20).

It can also be seen that the fixing ratio can be further enhanced by further inclusion of a binder resin as well as the polymer (A) in a toner (comparison between Examples 1 and 7 to 9 and comparison between Examples 12 and 14 to 16). Furthermore, it can be seen that a good fixing ratio can be obtained by use of a polymer even if the content ratio of a binder resin is small (for example, comparison among Examples 1, 7, and 8).

Meanwhile, it can be seen that the printed matters of Comparative Examples 1 to 3 using a toner containing the comparative compound 1 (as the azobenzene group-containing compound) have low fixing ratios of toner images.

According to an embodiment of the present invention, it is possible to provide a toner and an image forming method capable of forming a toner image having a high image intensity in a fixing method by light irradiation.

Although embodiments of the present invention have been described and illustrated in detail, the disclosed embodiments are made for purposes of illustration and example only and not limitation. The scope of the present invention should be interpreted by terms of the appended claims.

What is claimed is:

1. A toner comprising toner particles, wherein
the toner particles contain a polymer containing a structural unit formed from a monomer having an azobenzene group and a polymerizable group, and
the polymerizable group comprises a (meth)acryloyl group, an epoxy group, or a vinyl group.

2. The toner according to claim 1, wherein
the monomer has the polymerizable group as only one polymerizable group in one molecule.

3. The toner according to claim 1, wherein
the monomer has a group represented by any one of the following formulas (i) to (iii) as the polymerizable group:

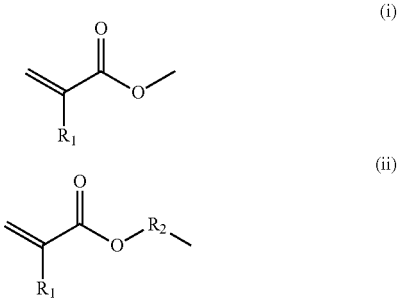

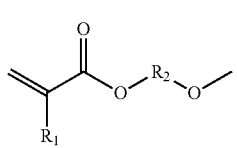

where

R₁ represents a hydrogen atom or a methyl group, and

R₂ represents an alkylene group having 1 to 12 carbon atoms.

4. The toner according to claim 1, wherein the monomer is represented by the following formula (1):

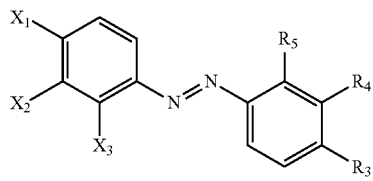

where any one of X₁ to X₃ represents the polymerizable group, and the remaining groups each represent a hydrogen atom, and R₃ to R₅ each represent a hydrogen atom, a functional group containing a hetero atom, an alkyl group having 1 to 12 carbon atoms, or an alkoxy group having 1 to 12 carbon atoms.

5. The toner according to claim 4, wherein the monomer is represented by the following formula (2):

where

X₁ represents the polymerizable group, and

R₃ represents a hydrogen atom, a functional group containing a hetero atom, an alkyl group having 1 to 12 carbon atoms, or an alkoxy group having 1 to 12 carbon atoms.

6. The toner according to claim 5, wherein the monomer is represented by the following formula (3):

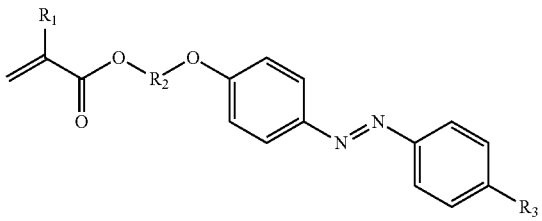

where

R₁ represents a hydrogen atom or a methyl group,

R₂ represents an alkylene group having 1 to 12 carbon atoms, and

R₃ represents a hydrogen atom, an alkyl group having 1 to 4 carbon atoms, or an alkoxy group having 1 to 4 carbon atoms.

7. The toner according to claim 1, wherein the polymer further contains a structural unit formed from a monomer having a styrene structure.

8. The toner according to claim 1, further comprising a binder resin.

9. The toner according to claim 1, optionally further comprising a binder resin, wherein a content ratio between the polymer and the binder resin is polymer:binder resin=60:40 to 100:0 (mass ratio).

10. An image forming method comprising:

forming a toner image containing the toner according to claim 1 on a recording medium; and irradiating the toner image with light to soften the toner image.

11. The image forming method according to claim 10, wherein the light has a wavelength of 280 nm or more and less than 480 nm.

12. The image forming method according to claim 10, further comprising pressurizing the softened toner image.

13. The image forming method according to claim 12, wherein the toner image is further heated in the pressurizing.

14. A toner comprising toner particles, wherein the toner particles contain a polymer containing a structural unit having an azobenzene group and having a number average molecular weight Mn of 3500 or more.

15. The toner according to claim 14, further comprising a binder resin.

16. The toner according to claim 14, optionally further comprising a binder resin, wherein a content ratio between the polymer and the binder resin is polymer: binder resin=60:40 to 100:0 (mass ratio).

17. An image forming method comprising:

forming a toner image containing the toner according to claim 14 on a recording medium; and irradiating the toner image with light to soften the toner image.

* * * * *